United States Patent [19]

Balbes et al.

[11] 4,189,755
[45] Feb. 19, 1980

[54] TELEVISION RECEIVER THRESHOLD EXTENSION SYSTEM BY MEANS OF SIGNAL-TO-NOISE CONTROL OF BANDWIDTH

[75] Inventors: Michael S. Balbes, Rockville; John M. Moore, Silver Spring, both of Md.

[73] Assignee: Microdyne Corporation, Rockville, Md.

[21] Appl. No.: 887,681

[22] Filed: Mar. 17, 1978

[51] Int. Cl.² .............................................. H04N 5/44
[52] U.S. Cl. .................................................... 358/904
[58] Field of Search ........................................ 358/904

[56] References Cited

U.S. PATENT DOCUMENTS

| | | | |
|---|---|---|---|
| 2,488,612 | 11/1949 | Tunick | 358/904 |
| 2,661,399 | 12/1953 | Harvey | 358/904 |
| 3,633,119 | 1/1972 | Balbes | 330/21 |
| 3,872,387 | 3/1975 | Banach | 358/904 |

OTHER PUBLICATIONS

Motorola Spec. Sheet MC 1595L, MC 1495L, pp. 8–411.
RCA Linear Integrated Circuits, p. 398, Nov. 1974.

*Primary Examiner*—Robert L. Richardson
*Attorney, Agent, or Firm*—William D. Hall

[57] ABSTRACT

This disclosure relates to electronic devices, such as a television receiver, whose bandwidth is automatically reduced when the signal-to-noise ratio of the incoming signals becomes lower. Two circuits respectively sample the received video signals and the noise. The outputs of these two circuits feed a divider which divides one output by the other. A tuned filter (which follows an IF stage of the television receiver), which varies its bandwidth according to a control voltage fed to it receives the varying output voltage of said divider. The video and noise signals, which are fed to the divider, are both derived from the sync signal of the television receiver. Timing circuits control the operation of the system. One of these circuits distinguishes the sync signals from the equalizing pulses and eliminates the latter thereby reducing the error in the noise measurements. Another timing circuit eliminates signals, that occur while video-intelligence is occurring, from entering into the signal-to-noise ratio determination. The system will perform for television signals in which the baseband signals satisfy the following:

1. The video information is in analog form.
2. Two fixed levels are multiplexed with the video and are such that the difference level is a known function of the video level.

In the case of a National Television System Committee (NTSC) television signal such as the circuits described here are specifically designed for, the video signal is in analog form and the two fixed levels are the tip of the synchronizing (sync) pulses and its base level sometimes referred to as the porch. This base level is that level defined as the video blanking level.

35 Claims, 12 Drawing Figures

DIVIDER J

TELEVISION RECEIVER THRESHOLD EXTENSION SYSTEM BY MEANS OF SIGNAL-TO-NOISE CONTROL OF BANDWIDTH

BACKGROUND OF THE INVENTION

It is well known in various forms of electronic devices, including television receivers, that it is desirable to reduce the bandwidth of the device when the signal to noise ratio falls to objectionably low levels. One prior art system for controlling the receiver bandwidth is U.S. Pat. No. 3,633,119 Michael S. Balbes, granted Jan. 4, 1972. In that device a tuned filter was placed in cascade with an I.F. amplifier of a frequency modulated receiver. A control voltage, under manual control, varied the bandwidth of the filter. Human intervention is, of course, an apparent requirement in such a system and an obvious drawback in many situations.

SUMMARY OF THE INVENTION

In its broader aspects, the invention produces "first" and "second" signals that respectively represent the amplitudes of (a) the incoming signals without noise, and (b) the noise. The "first" and "second" signals are fed to a divider the output of which is employed to control a voltage tuned filter such as the one described in Balbes U.S. Pat. No. 3,633,119 described above.

A novel improvement on the foregoing basic concept resides in application of the invention to a television receiver for receiving a frequency modulated video signal.

The aforesaid "first" signal which represents the amplitude of the incoming signal is derived from the amplitude of the incoming "sync" signal.

The aforesaid "second" signal which represents the amplitude of the noise is derived as follows. Most of the noise power has a much higher frequency than the "sync" signals. Therefore, an averaging and storage circuit responding to the "sync" signals may establish a datum voltage (which may be ground) about which the higher frequency noise varies. The "second" signal representing the amplitude of the noise is then developed by ascertaining the excursions of the noise from said datum.

When the incoming signal level drops objectionably low, relative to the noise, the voltage fed to said voltage-tuned-filter may change in one or more steps, or continuously, to narrow the bandwidth of the receiver.

Novel timing circuits control the operation of the system. One of these circuits distinguishes the sync signals from the equalizing pulses and eliminates the latter thereby reducing the error in the noise measurements. Another timing circuit eliminates signals, that occur while video-intelligence is occurring, from entering into the signal-to-noise ratio determination.

BRIEF DESCRIPTION OF THE DRAWINGS

FIGS. 1 and 2 show the preferred form of the invention in block diagram form.

FIGS. 3 to 10 show a schematic circuit which constitutes the block 29 of FIG. 2.

Figure 1:
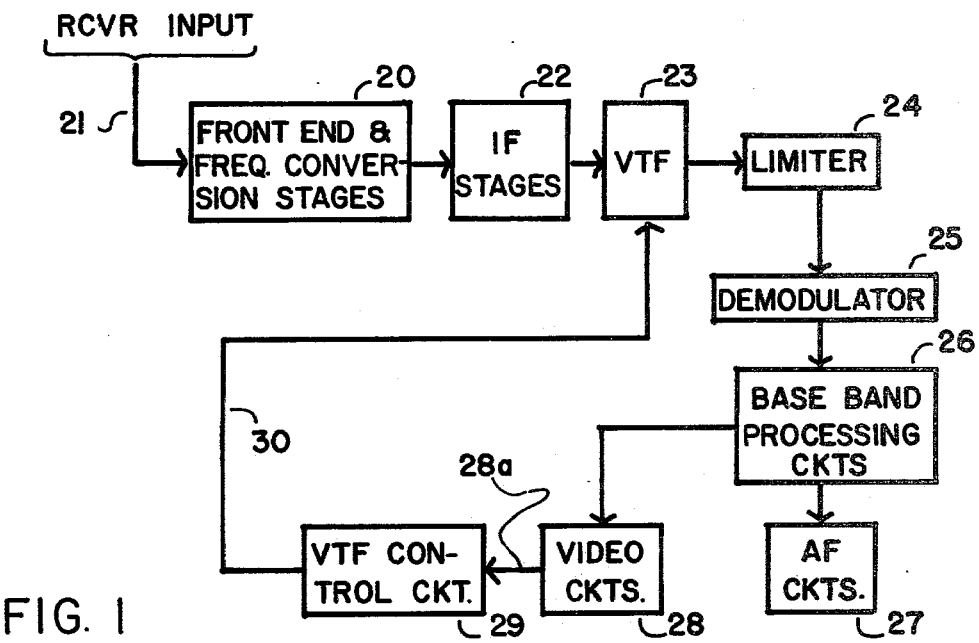
FIG. 1 is a block diagram of a television receiver for receiving frequency modulated video and audio signals, embodying the invention.

Since FIGS. 3 to 10 would normally comprise a single printed circuit board they would normally form a single sheet of schematic drawings but since the schematic is too extensive to fit onto a single sheet, it is placed on eight sheets interconnected as explained in the next paragraph.

In the drawings, we have referred to "wires" 28a, 300 to 304, 400, 401, 500, 501, 600, 608, 900, $V_x$, $V'_x$, $V_z$ and $V'_z$ which extend from one figure of the drawing to another. We use the word "wire" in its broadest sense to include any form of connection including printed circuit connections. In general, when some part of one figure of a drawing is connected to a part of another figure(s) of a drawing, each and all "wires" forming such connection bear a common reference number.

DETAILED DESCRIPTION OF THE DRAWINGS

A preferred embodiment of the invention, as applied to a television receiver for receiving frequency modulated video and audio signals, is shown in FIG. 1. In that embodiment, the conventional front end and frequency conversion stages 20 have an input 21 and feed at least one intermediate frequency amplifier stage 22. A voltage tuned filter 23 may conform in construction and mode of operation to U.S. Pat. No. 3,633,119, dated Jan. 4, 1972 to Michael S. Balbes. If there is more than one I.F. amplifier, a voltage tuned filter 23 may be used after each such I.F. amplifier stage as taught by the Balbes patent. The output of the voltage tuned filter is the input to conventional limiter 24 which feeds conventional demodulator 25 which feeds a conventional baseband processing circuit 26, which feeds in the usual manner: (a) audio frequency circuit 27 and (b) the video circuit 28. The baseband processing circuit "conditions" the demodulated signal by subjecting it to de-emphasis and filtering as required and separating the various signals such as video, audio and possibly others. The video circuits (block 28) in this diagram include the synchronizing and timing circuits.

The video signals in video circuit 28 include a sync signal, a video signal and the noise. These are fed out of video circuit to the input of voltage tuned filter control circuit 29 (hereinafter referred to as "VTF control circuit").

VTF control circuit 29 feeds an output signal, on wire 30, which begins to change when the signal-to-noise ratio (as determined from the signals in the output of video circuit 28) falls below a threshold value. The output signal is fed through line 30 to the control input (line 62 in FIG. 3 of said Balbes patent) of the voltage tuned filter 23.

In operation, the block diagram of FIG. 1 operates in the same way as a conventional FM television receiver, except that: (1) if the signal-to-noise ratio is above a selected level the bandwidth of voltage tuned filter 23 is so wide as to comprehend the entire intelligence of the video and audio signals on input 21, and (2) if the signal-to-noise ratio should fall to an objectionably low level, the VTF control circuit 29 will provide an amplitude for the signal on wire 30 to give a decreased bandwidth for voltage tuned filter 23. As will appear, the variation of the signal on line 30 may occur (in one form of the invention) in one or more steps, or (in another form of the invention) it may be a continuous variation. Any variation which restricts the bandwidth does not begin until the signal-to-noise ratio falls to an objectionably low level.

Instead of the output of VTF control circuit 29 being an analog of the video signal/noise ratio, as described above, it may be an analog of the noise-to-signal ratio provided the voltage tuned filter 23 is designed to decrease its bandwidth when the noise-to-signal ratio increases above a predetermined level.

The foregoing improvement is especially applicable to television receivers designed to receive frequency modulated signals via a satellite since in that case the incoming signals are usually weak and may require changes in the bandwidth, from time to time, to avoid objectionable noise.

Figure 2:
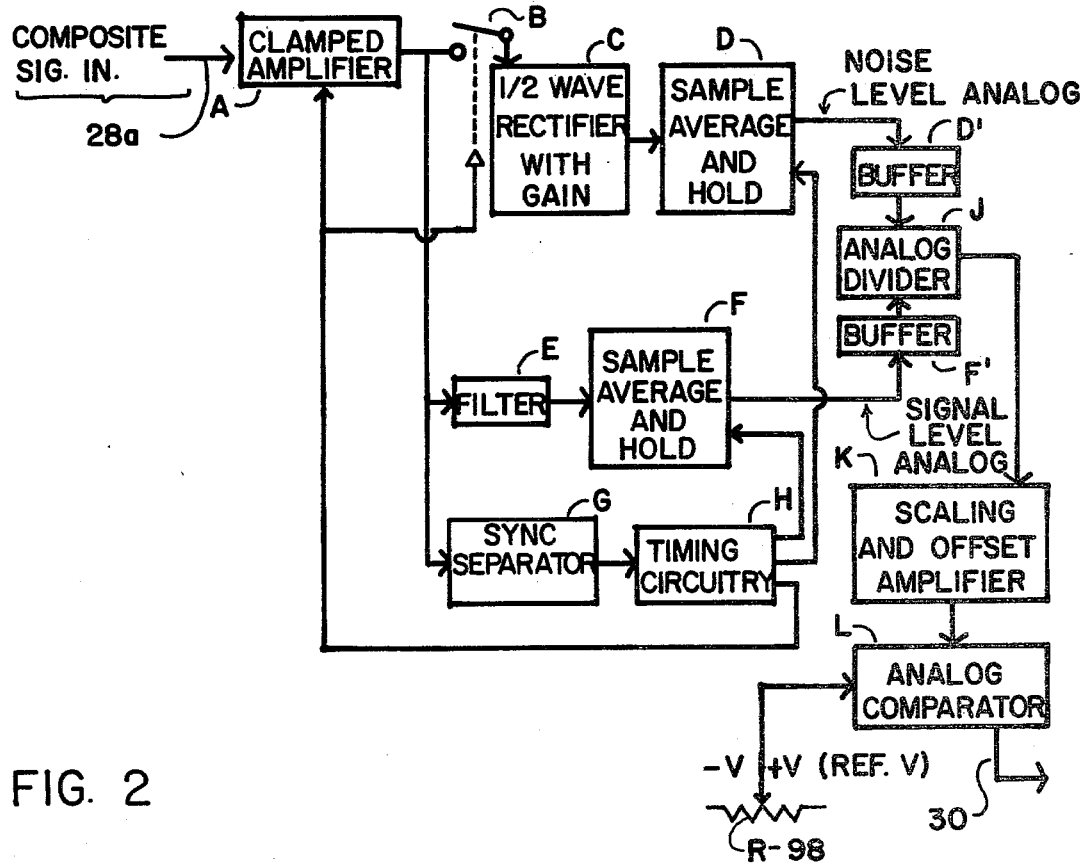
FIG. 2 is a block diagram of the Voltage Control Circuit represented by block 29 of FIG. 1.

FIG. 2 is a block diagram of VTF control circuit 29 of FIG. 1. The blocks of FIG. 2 bear letters A to L and a schematic of the circuitry of the blocks is shown in FIGS. 3 to 10 with the circuit elements comprising each block designed by a letter A to L complementary to the corresponding letter on the block of FIG. 2.

In FIG. 2 the output of video circuits 28 enters at the left end of the block marked "clamped amplifier A". This signal is a composite signal which contains sync, blanking, possibly color burst and video signals time multiplexed together. This amplifier adjusts the dc level of the signal's waveform such that the tips of the sync pulses are established at a given (preferably zero) voltage reference level. The clamped output signal from the amplifier A is fed to filter E and to sample average and hold circuit F where a "first" signal is developed the amplitude of which is directly related to the amplitude of the sync pulses. The amplitude of the sync pulse is a constant percentage of the video's absolute amplitude, i.e., its blanking to white level. The filter E is necessary only for a color signal and removes the color burst in such a signal. The sample average and hold circuit F samples the base level of the sync pulses (or "back porch" of the composite signal) immediately following the sync pulse. This level referenced to the sync tip level (0 volts) establishes the sync pulse amplitude and, therefore, the video's absolute amplitude. This level is held until the next sync signal up-dates it.

A "second" signal whose amplitude is approximately proportional to the noise is also developed in a manner hereinafter developed and later described in detail. The output signal from the clamped amplifier A is fed to switch B which passes only the sync tip plus noise portion of the composite waveform. This is buffered and passed to the half-wave rectifier circuit C. The sync tip which is clamped to said given (preferably ground) level, leaves only the noise excursions from this level to activate the input of rectifier C. Rectifier C rectifies, amplifies and inverts only the positive excursions of the noise on the sync tip while it is nonresponsive to the negative excursions. This rectified signal is fed to the sample average and hold circuit D. The rectified noise is sampled during its occurrence, averaged with past samples and held in circuit D.

The outputs of blocks D and F pass through buffers D' and F' to the analog divider J. The divider is one in which an analog multiplier is incorporated in the negative feedback path of an operational amplifier so as to produce the inverse of multiplication, i.e., division. A circuit of a suitable one is shown and described in the current Motorola "Specifications and Applications Information" for its products MC1595L and MC1495L, at page 8–411 (FIG. 25) of their Linear Integrated Circuits Data book, third edition. That divider with minor modifications adapting it for use in our VTF control circuit is shown as element J in FIG. 8 hereinafter described.

The output of the divider J is fed through scaling and offset amplifier K, hereinafter described in detail, to analog comparator L. The signal from block K is then compared with the selected reference level from potentiometer R-98. The selected setting of potentiometer 98 selects the threshold of signal to noise ratio below which threshold there is a voltage change on output wire 30 which causes the voltage tuned amplifier 23 to reduce its bandwidth.

As explained above, the signal on wire 30 may be varied by VTF control circuit 29 in steps, or continuously. In one embodiment of the invention the signal on wire 30 attains only two levels. In that embodiment, whenever the output level of amplifier K is above the voltage on the output arm of potentiometer R-98 the signal on wire 30 calls for a full bandwidth of the voltage tuned filter 23. However, at all times during which the voltage at the output of amplifier K is below the threshold voltage on the output arm of potentiometer R-98, the signal on wire 30 calls for a given predetermined bandwidth of the voltage tuned filter 23 which is less than that required to receive all of the intelligence on the incoming video signal at input 21. The restricted bandwidth is proportioned to improve reception by trading-off high frequency video information for reduced noise.

The waveforms and timing values shown correspond to those produced when the VTF control circuits are processing an NTSC television composite signal (commonly in use in the United States). The circuits can be modified to work with similar television signals commonly in use in the world today.

Figure 2A:
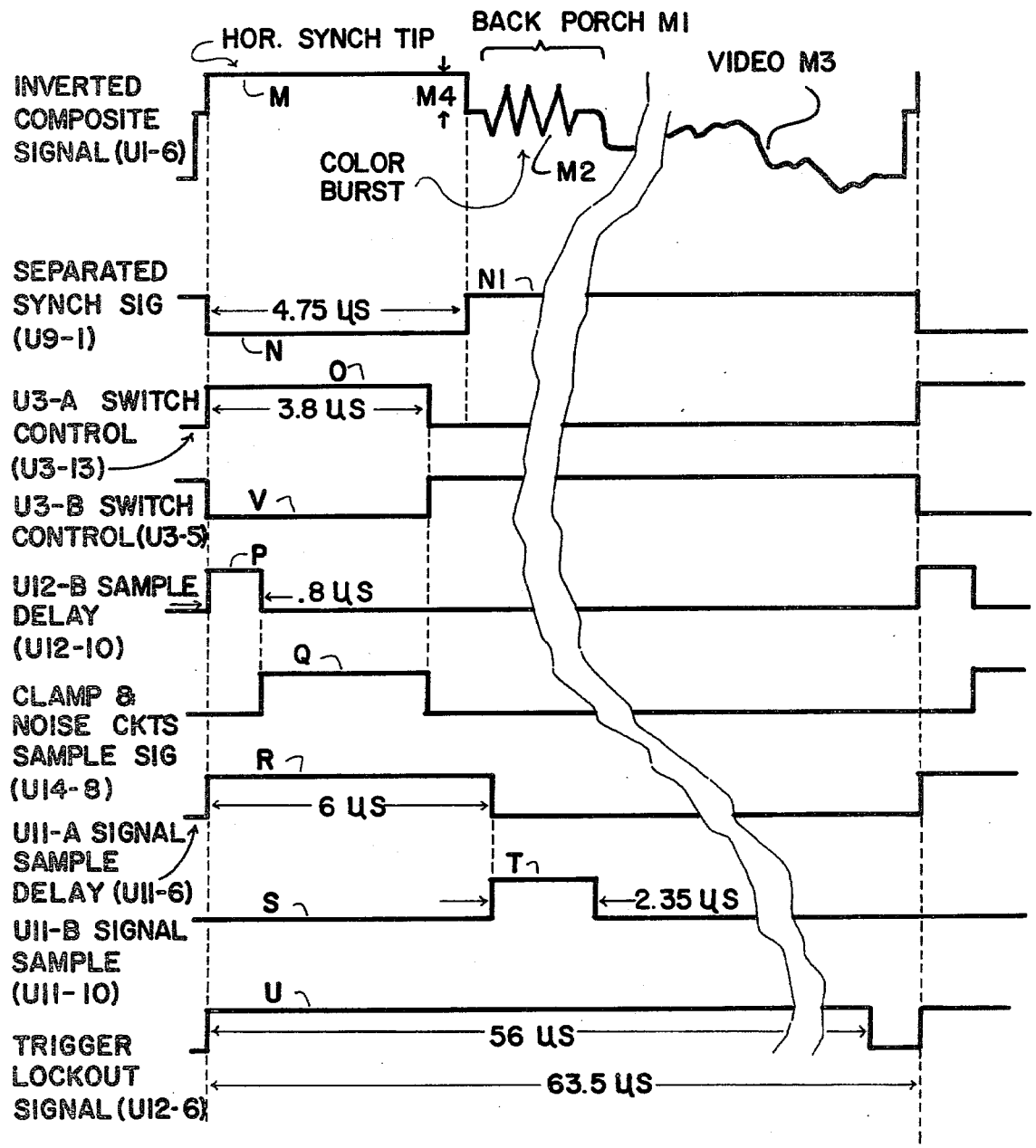
FIG. 2A is a timing diagram useful in explaining one particular embodiment of the invention.

FIG. 2A is a timing diagram of the circuit of FIGS. 2, and 3 to 9 inclusive.

Figure 3:
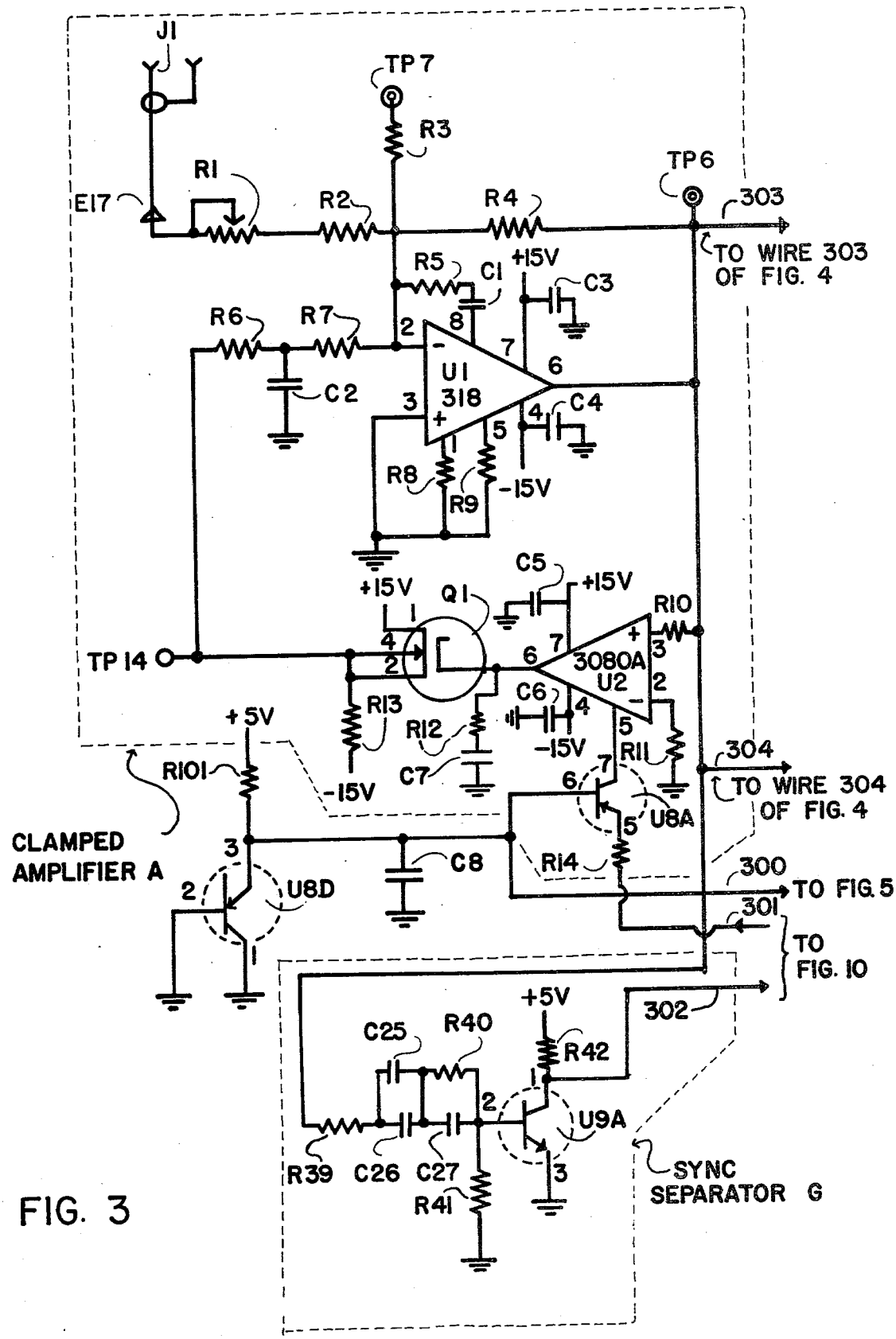
FIG. 3 is a schematic diagram of blocks A and G of FIG. 2.

The first timing wave shown on FIG. 2A is the inverted composite signal appearing at pin 6 of operational amplifier U1 (FIG. 3). It has a horizontal sync tip M, a back porch M1, a color burst M2 on the back porch, and a video intelligence signal M3. The timing wave, just described, repeats itself every 63.5 $\mu$s during a given field, and has a horizontal sync tip portion of 4.75 $\mu$s nominal duration.

The second timing wave of FIG. 2A is the separated sync signal appearing at the output pin 1 of transistor U9A of part G shown in FIG. 3. This timing wave comprises an inverted horizontal tip portion N which is 4.75 μs long together with a quiescent voltage for period N1 of 58.75 μs duration. It is, therefore, the horizontal sync tip inverted, and also separated from the remainder of the first timing wave.

Figure 4:
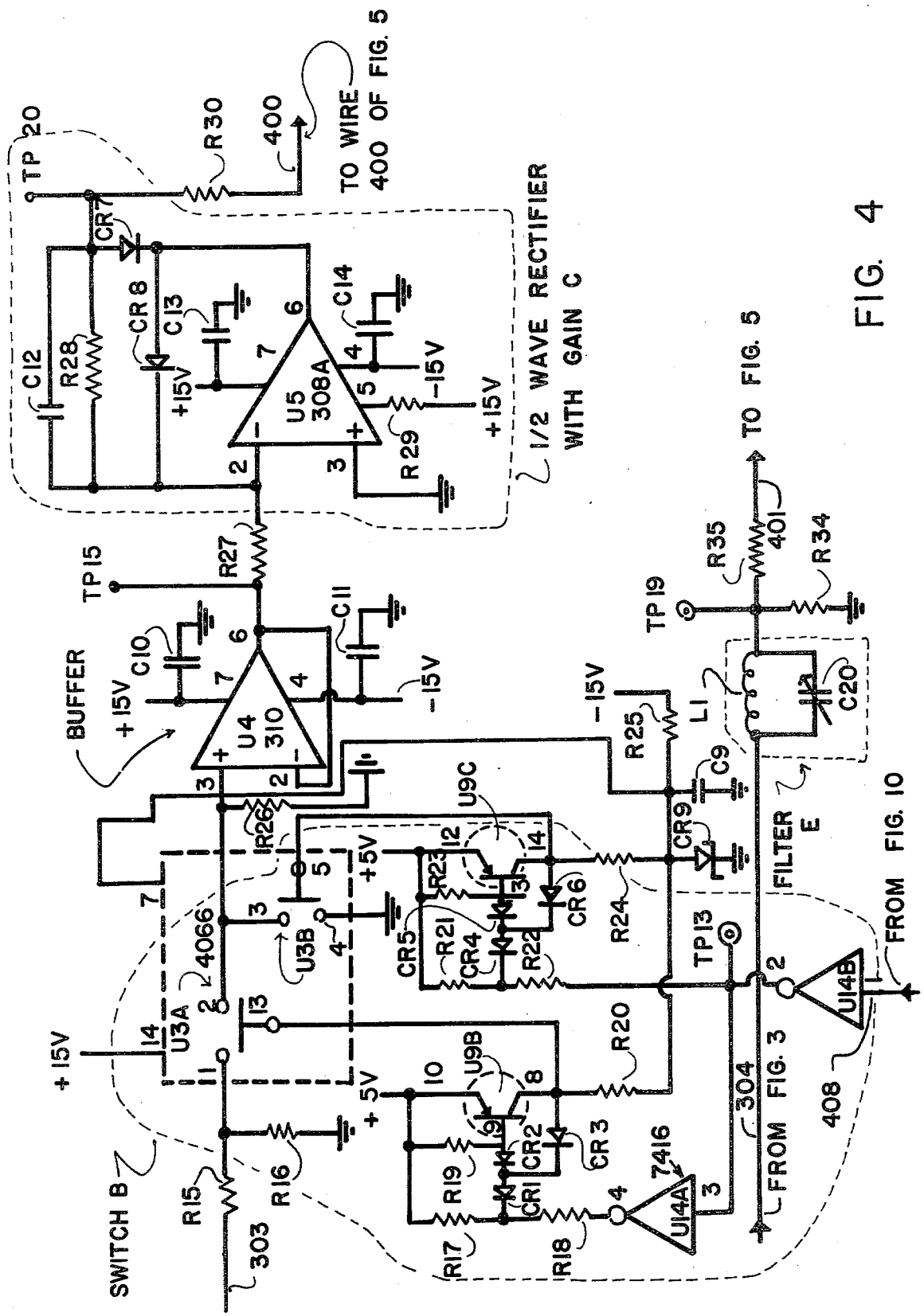
FIG. 4 is a schematic diagram of the blocks B, C and E (and associated circuitry) of FIG. 2.

The third timing wave of FIG. 2A is the voltage of pin 13 of switch U3A of part B (FIG. 4). It consists of a positive going square pulse O of 3.8 μs duration followed by a low level for 59.7 μs.

The fourth timing wave of FIG. 2A is the input on pin 5 of switch U3B of part B (FIG. 4). This waveform consists of a negative going square pulse V of 3.8 μs since switch U3B is off when switch U3A is on and vice-versa. Following the pulse V, there is quiescent volts for 59.7 μs.

Figure 10:
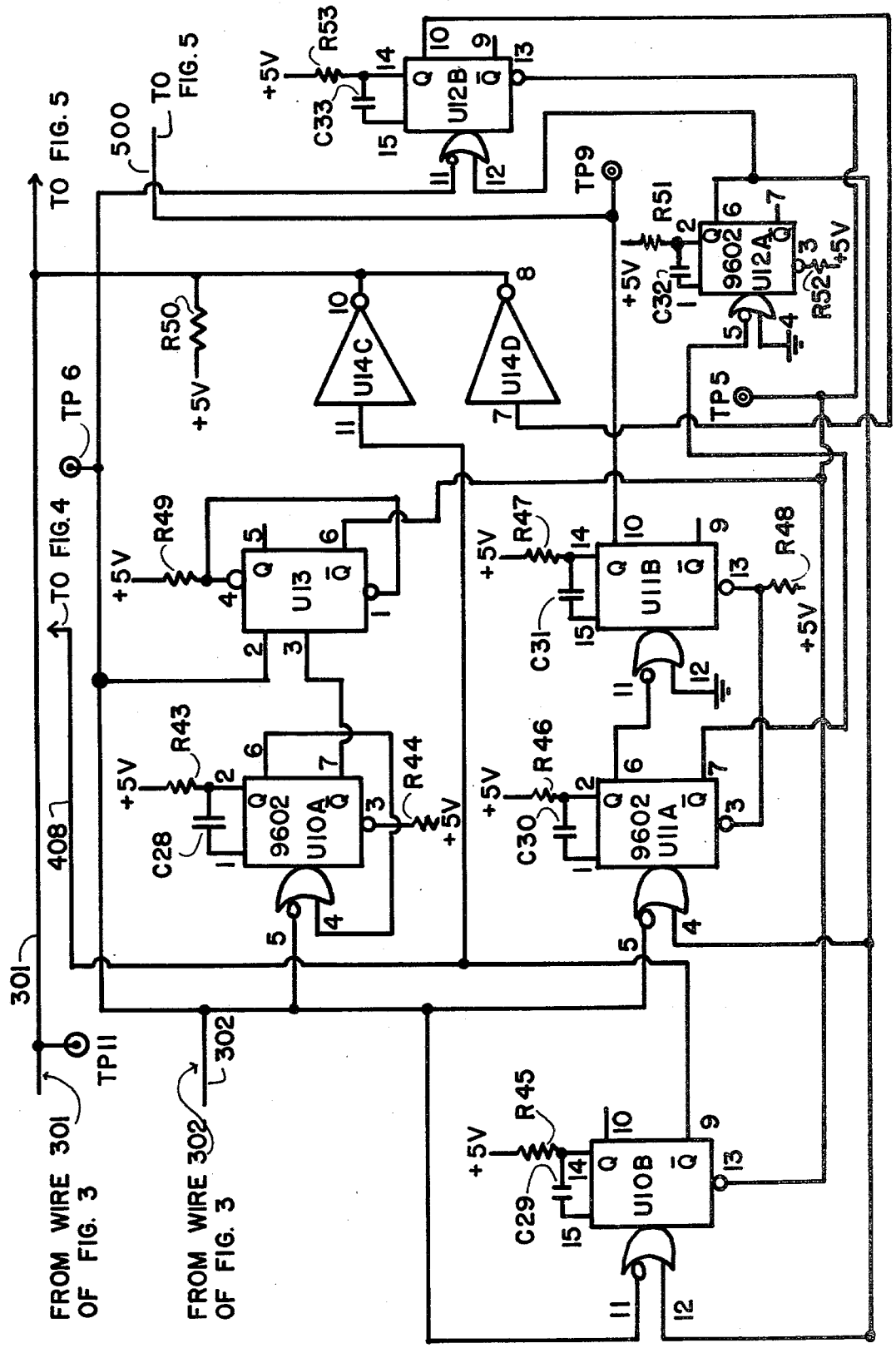
FIG. 10 is a schematic diagram of timing circuit H of FIG. 2.

The fifth timing wave of FIG. 2A shows the signal on pin 10 of "one shot" U12B, see part H shown in FIG. 10. This signal P is of 0.8 μs duration followed by zero volts for 62.7 μs.

The sixth timing wave of FIG. 2A is the signal appearing on pin 8 of "one shot" U14 (FIG. 10), and is the difference between waveforms O and P described above. It comprises a positive going square pulse delayed from the beginning of a new horizontal line of the picture by 0.8 μs and having a portion Q extending for 3 μs followed by zero volts for 59.7 μs.

The seventh timing wave of FIG. 2A appears on pin 6 of inverter U11 (part H shown in FIG. 10). This timing wave comprises a square pulse R of 6 μs duration which is used to trigger on sampling signal T (which appears on pin 10 of "one shot" U11) shown in the eighth waveform. The eighth waveform therefore comprises a portion S at zero volts for 6 μs, a sampling signal T of 2.35 μs followed by zero volts for 55.15 μs. The sampling signal T samples the back porch M1 after the color burst M2 has been removed by filter E (FIGS. 2 and 4).

The ninth waveform of FIG. 2A is a trigger inhibit signal having a portion U represented by a positive signal of 56 μs duration. This latter signal is used to "lock out" various circuits so that the noise on the composite waveform M3 cannot operate those various circuits during said 56 μs when those various circuits should be off.

In describing the schematic circuitry, there are certain general statements which are applicable throughout the description of FIGS. 3 to 10 inclusive. In connection with the various integrated semiconductor circuits, using that term broadly, we have placed a reference number such as U1, U2, etc., in or adjacent the integrated circuit (IC) and have also included the type number of the unit. For example, in connection with the IC (amplifier) U1, we included in the triangle, the generic number 318 which means that one form of the unit may be the standard type 318 amplifier as sold by many manufacturers of semiconductors. The actual part number consists of the generic number with a prefix indicating the manufacturer, and a suffix indicating the type package (or case) employed. In addition, the integrated circuit pin numbering of the package has been included. The pin number is given for the metal can package for the following IC's: U1 (type 318), U2 (3080A), U4 (310), U5 (3080A), U6 (3080A), U7 (3080A), U15 (308), U16 (308), U18 (308), U19 (308), and U20 (311). The remainder of the integrated circuits have pin numbers given for the dual-in-line package and these circuits are as follows: U3 (4066), U8 (MPQ3799), U9 (MPQ6002), U10 (9602), U11 (9602), U12 (9602), U13 (7474), U14 (7416) and U17 (1495). The pin numbers have been added adjacent to the associated wire entering or leaving the IC. Furthermore, throughout the drawings, we have designated various test points and in some instances have given a number to the test points. Test points are designaed by the letters TP, which are followed in some instances by a particular number for that test point. These test points are of value to the maintenance personnel, in determining what parts or modules of the overall device are in need of repair if such should happen to be the case.

We next describe the schematic of the clamped amplifier shown as part A of FIG. 2. This schematic is contained within the dash lines A of FIG. 3.

A composite signal (sync signal, video signal and the noise riding on those signals) from the output of video circuits 28 (FIG. 2) is fed in at input J1 (FIG. 3) of clamping amplifier A, and it is fed through resistor R1 which adjusts the gain of the amplifier A which consists of operational amplifier U-1 (type 318) and associated circuitry. Pin 2 of amplifier U-1 is the summing junction. The signal gain of said amplifier is determined by the ratio of the resistance of resistor R4 to the sum of the resistances of resistors R1 and R2. Resistor R5 and condenser C1 comprise a form of feed forward compensation to increase the bandwidth. Resistors R8 and R9 also increase the bandwidth of said amplifier and would not necessarily be used with other amplifiers having adequate bandwidth without them. Amplifier U-1, pin 6 is the output of said amplifier. The aforesaid composite signal is inverted at this point. It is fed back through resistor R10 to an amplifier U2, which is a gateable amplifier that is gated off and on by a signal fed into its pin 5. Amplifier U2 is used in conjunction with condenser C7 and field effect transistor (FET) Q1, to generate feedback voltage which is fed back via resistors R6 and R7 to summing point pin 2 of amplifier U1. Amplifier U2, capacitor C7 and FET Q1 are used to translate the average value of the amplified signal such that the sync tips of said composite signal are maintained at virtual ground. Amplifier U2 is gated on, by sync separator G, only during the sync tip time as will appear. During the rest of the time, the output of amplifier U2 is at a high impedance level.

During its gated on time, amplifier U2 amplifies the error voltage which is the difference betwen ground level and the sync tip level at pin 6 of amplifier U1. Transistor U2 amplifies said error voltage to charge condenser C7. Condenser C7 is a memory capacitor which stays charged, even after amplifier U2 is gated off. Indeed, condenser C7 stays charged until the sync signal of the next horizontal line of the picture is received. This increases or decreases the charge on C7 according to whether the amplitude of the latter sync pulse is greater or less than the time weighted average of previous sync pulses. Condenser C7 drives FET Q1 which is connected as a voltage follower, and FET Q1 transmits a signal directly related to the charge on condenser C7, with no gain back, through resistors R6 and R7 to pin 2 of amplifier U1. This is a form of negative feedback because energy is being fed back into the inverting input of amplifier U1. This feedback is in such a direction that it tends to reduce the error voltage (the difference between the sync tip level and the ground) at pin 6 of amplifier U1. The clamping action (maintaining the signal's DC level such that the sync tips are near ground) is obtained by amplifier U2, condenser C7 and FET Q1, feeding back to amplifier U1 a DC voltage that sets the DC level of the sync signal so that the sync tip is maintained near ground level. The sample, average and hold circuit comprised of U2 and Q1 has high open loop gain. But it is connected in a feedback path around amplifier U1. The closed loop circuit thus formed is a regulator which tends to adjust itself to minimize the sampled error voltage, i.e., the sync tip to ground level out of U1.

The gating voltage for amplifier U2 is produced by transistor U8A. When transistor U8A is conducting, amplifier U2 is turned (gated) on. When transistor U8A is non-conducting, amplifier U2 is turned off. Transistor U8A has a fixed voltage on its base (pin 6) which is generated at pin 3 of transistor U8D (which is a transistor section which is connected as a diode). Transistor U8D could be replaced by a diode. The base to emitter junction is used as a diode to generate approximately 0.7 volts at the base of transistor U8D. We have connected transistor U8D so that the base to emitter junction is used as a diode and generates approximately 0.7 volts, positive voltage, at the base of transistor U8 pin 6. Thus, transistor U8 pin 6 is biased with about 0.7 volts, positive, at all times; a voltage which never changes. It establishes a base voltage for transistor U8A. Transistor U8A is turned on and off by the voltage which is developed by logic inverters U14C and U14D. Transistors U14C and U14D (FIG. 10) are logic inverters, having a two-state output (a low and a high level). When the output level is at a high, it biases transistor U8A on so that amplifier U2 is gated on. But when the output level of logic inverters U14C and U14D is low, then transistor U8A is biased into an off (high impedance) state, which gates amplifier U2 off.

To enhance dynamic stability, it is desirable to have a by-pass condenser between the voltage supply terminals of each integrated circuit (IC) and ground. This maintains the supply terminals at AC ground potential. Condensers C3, C4, C5, C6 (FIG. 3) perform the function just described. Condensers C10, C11, C13, C14, C16, C17, C45, C46 perform the function just described in connection with the circuits (FIGS. 4 to 9) with which they are associated.

C8 is a filter condenser and keeps noise off of the line between U8A and U8D; and condenser C9 performs a similar function in its circuit.

Resistor R13 is pull down resistor on the source of FET Q1.

The output of the clamped amplifier (block A of FIG. 2) appears on pin 6 of amplifier U1. The waveform of the signal on this pin is shown as the first timing wave of FIG. 2A. That timing wave shows that the horizontal sync tip is clamped to virtual ground level M (FIG. 2A) but at the end of the horizontal sync tip portion of the composite video signal (fed into input J1) the potential at pin 6 of amplifier U1 immediately changes by voltage M4 (FIG. 2A) to back porch level M1. The voltage M4 is then capable of being measured to provide an analog voltage proportional to the video signal level.

Having traced the circuit of clamped amplifier A (FIG. 2) to its output (pin 6 of transistor U1), we will next discuss the switch which comprises block B of FIG. 2 and is also shown surrounded by the dashed line B of FIG. 4. This switch is required to prevent the overloading of the rectifier which comprises blcok C of FIG. 2. This circuit can be overloaded by too great an input amplitude and is slow to recover from such overloads. Since the circuit would be overloaded by the video portion of the composite signal, this signal is gated to its input only during the sync pulse tip occurrences and these levels are maintained near ground by the clamped amplifier A. This portion of the signal is the only required by the rectifier and the part which is not required (and has the troublesome levels) is held off by switch B. The output of clamped amplifier A (pin 6 of transistor U1) feeds input pin 1 of the integrated circuit U3 (of switch B). The construction and mode of operation of that switch and its associated circuitry is as follows.

The inverted composite video signal at pin 6 of amplifier U1 has an output that is fed through switch sections U3A to integrated circuit (IC) U4. IC U4 is a buffer for the switch U3A. Buffer U4 has no gain, as a voltage follower, and its output is not inverted. Switch sections U3A and U3B operate to gate on a signal to buffer U4 during the sync tip portions of the composite video signal. Those portions are the only part of the signal that should pass to the noise measuring circuits of the system. Switch section U3A is one section of the switch B (FIG. 2). Switch section U3B is an opposite section. They operate out of phase, that is, when switch section U3A is open, switch section U3B is closed, so that in this condition any feedthrough capacitively coupled across switch section U3A is grounded (by U3B and thus reduced to zero potential. During each sync tip portion of the composite signal, switch section U3A closes, and switch section U3B opens, to allow the signal to be fed into buffer U4, pin 3.

The circuits for operating switches U3A and U3B are discussed hereinafter in conjunction with the description of timing circuitry H.

Resistors R17, R18 and R19 in conjunction with diodes CR1 and CR2 determine the base current of transistor U9B. Similarly R21, R22 and R23 in conjunction with diodes CR4 and CR5 determine the base current of transistor U9C. Resistors R20 and R24 are collector pull down resistors for transistors U9B and U9C respectively. These pull down the potentials at the collectors of the transistors of U9B and U9C respectively when these transistors are non-conducting, i.e., in their "off" states. Diodes CR3 and CR6 prevent transistors U9B and U9C respectively from going into saturation in their "on" states, providing faster switching action.

The buffer U4 is a voltage follower circuit which reproduces the signal output of switch B (FIG. 2), but at a low impedance level, to drive the input (pin 2 of amplifier U5) of precision half wave rectifier C (FIG. 2). We will next describe rectifier C with particular reference to the schematic diagram of FIG. 5 where the rectifier C is enclosed in a dashed line marked C.

The signal at the input (pin 2) of semiconductor U5 during the closure time of switch U3A is the clamped sync tip with noise on it. At any other time it is at ground level as a result of closure of switch U3B.

Some of the low frequency noise is wiped off the clamped composite signal's sync tip by the clamp (part A of FIG. 2). The time constant of condenser C7 and amplifier U2 is not sufficiently long to let the low frequency noise through. But at higher frequencies, the clamp A (FIG. 2) cannot respond fast enough to clamp the signal at a noise peak. It clamps the average value of the sync tip plus noise (averaged over many sync tip duration periods) to ground level. Since the average of the noise voltage when averaged in this manner tends to zero, the composite signal is clamped such that its sync tip, minus noise, is at ground level. The positive portion of the noise is inverted by semiconductor U5 and appears at output pin 6 of semiconductor U5 as a negative signal.

This causes diode CR7 to conduct which effectively switches resistor R28 and condenser C12 between the output (pin 6) and inverting input (pin 2) of U5. The gain of the amplifier, at this time, is the ratio of the resistance of resistor R28 to the resistance of resistor R27. Hence, if resistor R28 has 10,000 ohms and resistor R27 had 499 ohms, the positive input noise peak is inverted and has a gain equal to 10,000÷499. However, the negative instantaneous noise coming into pin 2 of semidonductor U5 is inverted at its output and produces a positive voltage at pin 6 of semiconductor U5. This turns off diode CR7 and turns on diode CR8 which acts almost as a short circuit between pin 6 and pin 2 of semiconductor U5. There is essentially no gain at all in this circuit at this time since the output is effectively connected to the inverting input via CR8. Thus, the negative half of the noise is not passed by semiconductor U5, but the positive half of the input signal noise reaching input pin 2 of semiconductor U5 is passed and inverted with gain. Since the negative half was not passed, the rectifier C (FIGS. 2 and 4) rectified the noise and added gain to the rectified signal. It is only the positive noise pulses, at input pin 2 of semiconductor U5, which are passed, hence, output on pin 6 of semiconductor U5 is a half wave rectified signal with gain.

This semiconductor U5 has a fairly wide bandwidth, so that only a small part of the high frequency noise is lost. Excessive restriction of the noise bandwidth would degrade the noise measuring performance of circuits A to D (FIG. 2). The bandwidth of U5 is not broader than the bandwidth of the frequency modulation. For example, in one embodiment the bandwidth of semiconductor U5 and its associated circuits is approximately 2 megahertz. A wider bandwidth would provide more precise noise measurements, but it is very difficult to obtain a wider bandwidth with existing precision rectifiers capable of operating with low input signal levels. The noise measuring performance is degraded to some extent by the band limiting of half wave rectifier C (FIG. 2). Pin 5 of semiconductor U5 is only used in this particular integrated circuit because it is one which can be gated on and off, so current is supplied through resistor R29 to this pin 5 to gate it on continuously. There is not a requirement that this particular circuit be turned off as switch B effectively gates the signal into it. The negative supply voltage is fed in to pin 4. Condenser C14 is connected from pin 4 to ground and thus connects pin 4 to AC ground level. Positive 15 volts is fed into pin 7 which is a positive supply voltage for semiconductor U5. It is by-passed by condenser C13 since circuits such as this (part C of FIGS. 2 and 4) tend to oscillate or display other signs of instability if they are not by-passed at the supply ports.

Rectifier CR8 is used to provide the precision rectifying action which characterizes part C (FIGS. 2 and 4). Rectifier CR7 is also used in that rectifying action since it connects the output of rectifier CR8 to the output of part C (FIGS. 2 and 4). When the input signal on pin 2 of semiconductor U5 is positive, the output signal on pin 6 of semiconductor U5 is negative. Condenser C12 is added to enhance stability because the circuit has a relatively wide bandwidth and, therefore, has a tendency to oscillate under certain conditions. Condenser C12 reduces the possibility that oscillations will occur in the circuit of part C (FIGS. 2 and 4). The gain of the circuit of part C (FIGS. 2 and 4) is determined by the ratio of the resistance values of resistors R28 and R27 since part C (FIGS. 2 and 4) is connected as an inverting amplifier. The circuit of part C (FIGS. 2 and 4) would normally operate as an inverting operational amplifier except for the fact of rectifiers CR7 and CR8 are added to make the circuit act as a half wave rectifier instead of an operational voltage amplifier.

The half-wave rectifier (part C) is unusual in that it employs an Operational Transconductance Amplifier (OTA) in place of a simple conventional operational amplifier. The load presented to the OTA is essentially that resulting from the diode feedback circuit shunting its output (part D has a very high input impedance and its loading of part C is negligible).

The high frequency performance is essentially determined by how fast the OTA's output can slew to turn one of diodes CR7 and CR8 off and the other on in the feedback network. This requires a high open loop gain of the operational amplifier during this time for a fast transition through that region where one diode is switched off and the other on. The OTA's open loop gain ($A_{OL}$) is proportional to its load impedance. Thus, when the diodes CR7 and CR8 are in the switching transition region, both diodes CR7 and CR8 are in high impedance states and the $A_{OL}$ is high. With both diodes off, there is negligible feedback so that the circuit gain at this time is equal to $A_{OL}$ and the output slews rapidly.

Not much phase compensation is required, at this time, since the feedback path is essentially open and there is little feedback. After one diode is on, the feedback path is of low impedance to the OTA's output drops, its $A_{OL}$ drops and the actual feedback does not become adversely high due to the low $A_{OL}$ at this time. As a result of the moderate feedback under both conditions, not much phase compensation is required which would degrade the high frequency performance.

With a conventional operational amplifier, as has traditionally been used in this circuit configuration, the $A_{OL}$ is constant so that for a high $A_{OL}$ during the diode switching time (when it is needed), the $A_{OL}$ remains high after a diode is on. This results in a large amount of feedback requiring a large amount of phase compensation which causes a lowered frequency response limiting the noise bandwith of the amplifier.

In order to increase the high frequency response, Schottky Barrier diodes (CR7 and CR8) are used in the feedback network of the rectifier. These have high switching speeds as a result of their low turn-on voltage and allow the rectifier C to pass through the transition region faster. Fast diodes have been advocated for this circuit in literature concerning it. However, so far as is known Schottky Barrier diodes have not been used, probably because of their relative obscurity in the past.

Figure 5:
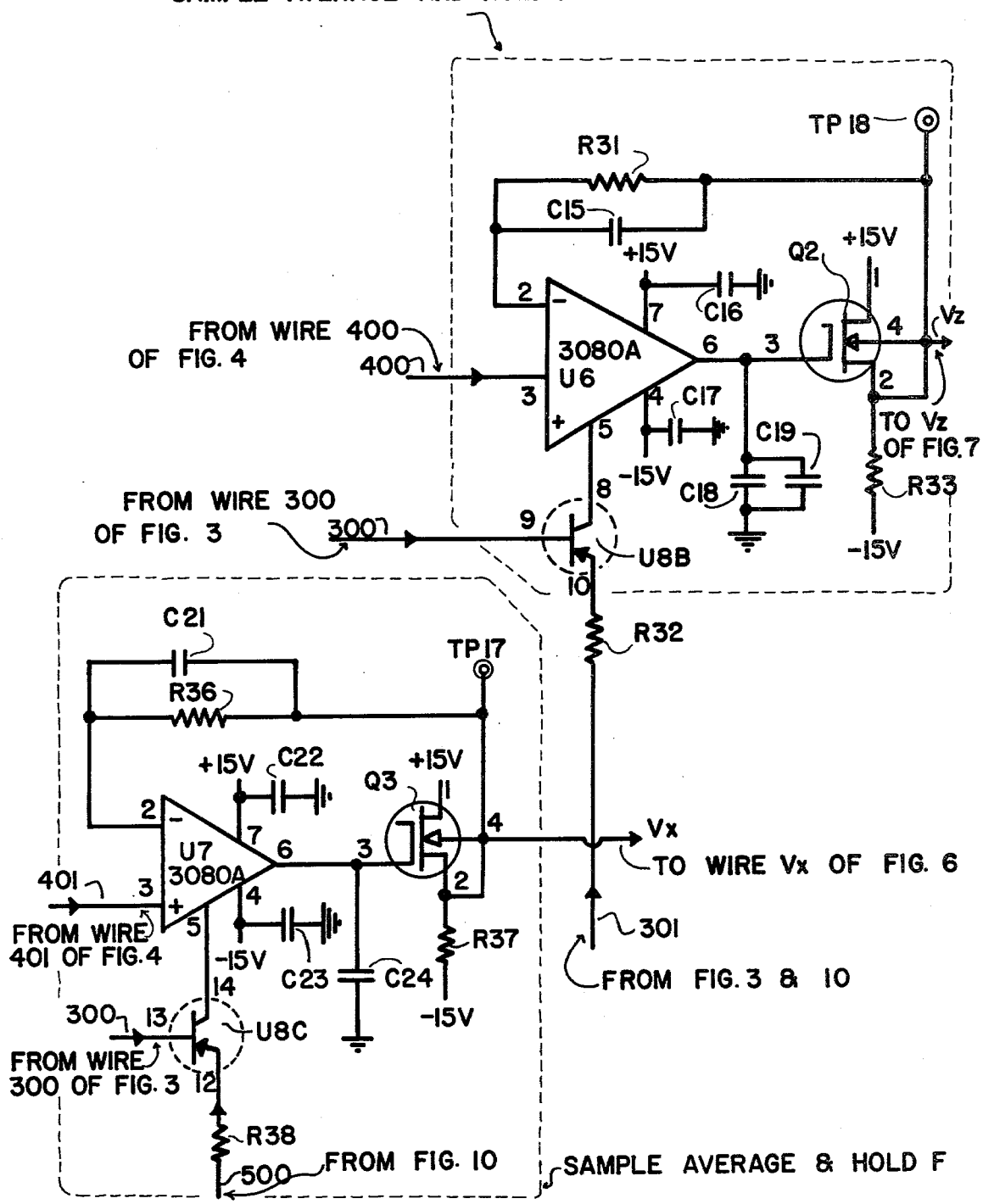
FIG. 5 is a schematic diagram of the blocks D and F (and associated circuitry) of FIG. 2.
Figure 6:
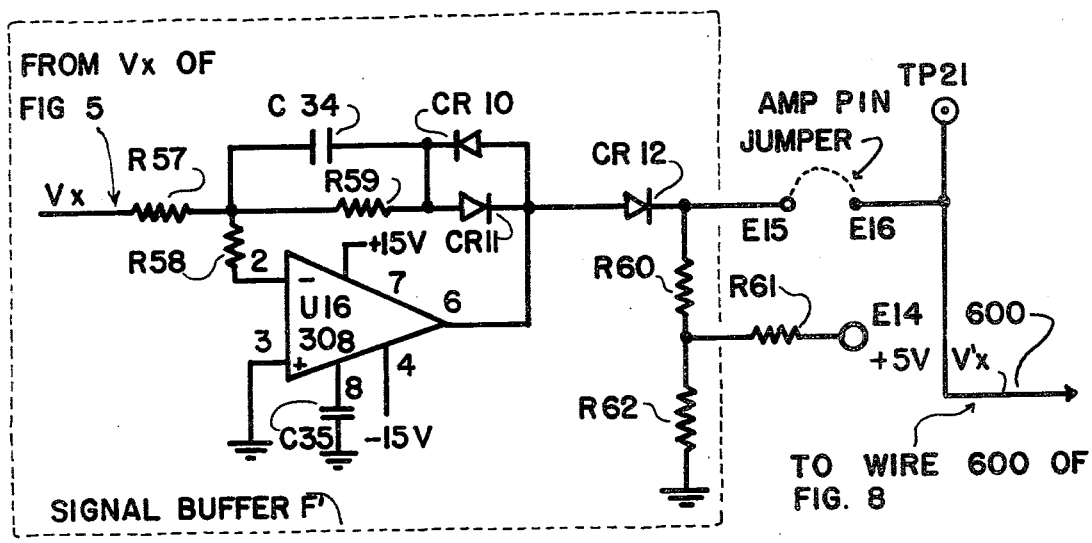
FIG. 6 is a schematic diagram of signal buffer F' of FIG. 2.

The output of rectifier C (FIGS. 2 and 4) appears at the upper end of resistor R30, and the lower end of resistor R30 constitutes the input to "sample, average and hold" circuit which is part D of FIG. 2 and is enclosed in dash lines denominated D in FIG. 5.

Part D (FIGS. 2 and 5) is a sample and hold circuit which also performs an averaging function. The input (received at pin 3 of amplifier U6) is a rectified noise voltage that is fed out of precision rectifier C. Part D has no voltage gain. It samples for a period of approximately 3 microseconds which occurs during the sync tip portion of the composite signal. Amplifier U6 is a gateable operational amplifier. When the transistor switch U8B is in a conducting state, amplifier U6 is gated on and the voltage present at pin 3 of amplifier U6 is amplified, is sent to pin 6 which is the output terminal of amplifier U6, and then charges parallel capacitor network C18 and C19. Then, FET Q2 is inputted with the voltage appearing across C18 and C19. This is a source follower circuit and has no voltage gain. The voltage across capacitor network C18 and C19 is buffered by FET Q2 which isolates them from the output which would otherwise adversely load them, causing the charge on them to leak down and a resulting voltage droop. That output is fed back through resistor R31 and condenser C15 to pin 2 of amplifier U6. This is the inverting input of amplifier U6. This feedback is a negative feedback which results in the overall circuit having a voltage gain of 1, when it is enabled.

During the sampling time amplifier U6 is enabled, has a voltage gain of 1, and charges capacitor network C18 and C19 to a voltage level that is equal to the voltage at the input of pin 3 of amplifier U6. The completion of the sampling period occurs when the logic inverters U14C and U14D output a low level biasing off transistor switch U8B. When transistor U8B stops conducting, amplifier U6 is gated into its off mode and the output terminal of amplifier U6 goes to a very high impedance state. This leaves capacitor network C18 and C19 charged and with no discharge path. The voltage across capacitor network C18 and C19 is held and maintained during the off time of amplifier U6, buffered by FET Q2, and outputted as voltage $V_z$ from terminals 2 and 4 of FET Q2.

Resistor R33 is a source pull down resistor for FET Q2, performing the same function as resistor R13 in the circuit of FET Q1.

The "off" time of amplifier U6 is, therefore, the hold period of the sample and hold circuit. $V_z$ is an analog of the noise voltage. Increase in the noise voltage on the sync tip causes an increase in the absolute value of $V_z$. Decrease in the noise voltage on the sync tip causes a decrease in the absolute value of the voltage $V_z$.

Figure 7:
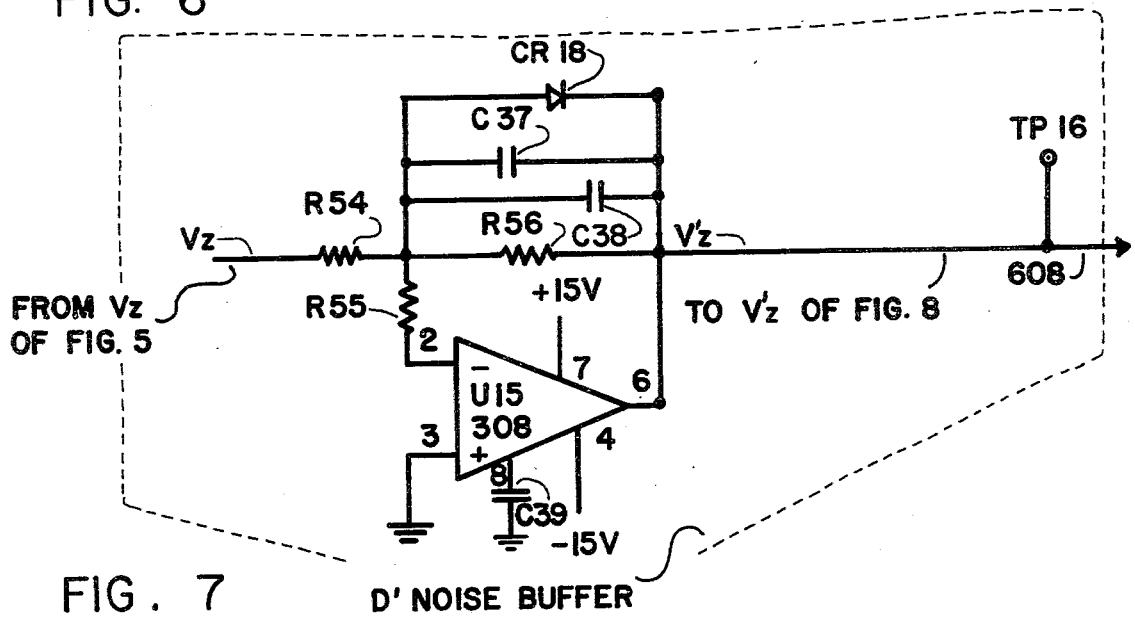
FIG. 7 is a schematic diagram of noise buffer D' of FIG. 2.

We have, therefore, traced the noise signal through the "sample average and hold" circuit D, and will next trace the noise signal through the noise buffer D' (FIGS. 2 and 7).

$V_z$ is fed to noise buffer D' (FIG. 7) consisting of amplifier U15 and its associated circuits. This amplifier U15 is an inverting amplifier and has a voltage gain of approximately 20. Voltage gain is determined by the ratio of the resistances of resistors R56 and R54. Condensers C37 and C38, across resistors R56, tend to roll off the frequency response of this amplifier and provide low pass filtering action on the input voltage $V_z$. This is done to remove the higher frequency components of $V_z$ since the response of the output voltage should be fairly low because it is undesirable for the voltage tuned filter 23 (FIG. 1) to effect rapid changes in the IF bandwidth which might otherwise result with some conditions of video signal-to-noise ratio.

Diode CR18 functions only if $V_z$ assumes a positive polarity. In the absence of diode CR18, a high positive polarity voltage at $V_z$ might drive amplifier U15 into saturation and possible latch-up so that amplifier U15 will not operate correctly if $V_z$ returns to a negative polarity. There would be a possibility that this could occur if the signal at J1 were lost for any reason and CR18 were not present.

The precision rectifier (part C) has a negative output voltage and it is fed into the sample average and hold circuit (part D) as a negative voltage and is outputted as a negative voltage, $V_z$. However, the noise buffer inverts this negative voltage so that we are back to a positive voltage at the output of noise buffer D'. This output signal of noise buffer D is labeled $V_z'$ and will be referred to as the video noise level analog. This is a positive voltage and it is fed into the numerator port of analog divider J as will soon appear.

We have now traced the output signal from video amplifier 28 (FIG. 1) through (a) clamped amplifier A, (b) switch B, (c) precision rectifier C, (d) sample, average and hold circuit D, and (e) buffer D' (FIGS. 2, 3, 4, 5 and 7), to the output $V_z'$. In other words, we have traced the signal path in which an analog of the video noise level is produced.

We will next trace the signal path in which an analog of the video signal level is produced.

The filter E is connected to shunt resistor R34 and the signal from filter E passes through resistor R35 to provide the desired voltage at the input of sample, average and hold circuit F.

The output of clamped amplifier A is the clamped composite signal which is inverted. The composite signal has a portion called the back porch (see M1 of FIG. 2A). On the back porch is a superimposed signal M2 (FIG. 2A) called the color burst. It consists of 8 cycles at a frequency of 3.58 megahertz. It is desirable to remove this 3.58 megahertz color burst. This is done by filter E (FIGS. 2 and 4) which is a parallel resonance circuit (comprising inductor $L_1$ and capacitor C20) acting as a trap to knock out signals whose frequency is 3.58 megahertz. This leaves the back porch of the composite signal clean.

The output of tuned filter E is fed to the input (pin 3 of amplifier U7) of sample average and hold circuit F (FIGS. 2 and 5) which is next to be described.

We will next describe sample, average and hold circuit F remembering that its function is to derive an analog of the video signal level, which signal is to be fed along with the "noise" signal from sample, average and hold circuit D to the divider J so that it can divide the signals to derive an output which is a function of the video signal-to-noise ratio.

The sample average and hold circuit of part F is identical to the sample average and hold circuit D. So the explanation of sample average and hold circuit D also applies to sample average and hold circuit F, the only difference being that the sample is taken at a different time for sample average and hold circuit F. For the sample average and hold circuit D the sample is taken during the sync pulse occurrence of the composite wave form. However, for sample, average and hold circuit F the sample is not taken during the sync pulse but immediately following the sync pulse (the portion of the composite wave form called the back porch, see M1 of FIG. 2A). This voltage is sampled during the back porch period stored in capacitor C24, and fed out of part F as voltage $V_x$. The back porch is sampled and measured with respect to ground. But, since the sync tip is clamped to ground, the back porch sample is really a voltage M4 (FIG. 2A) representing the difference between the back porch and the sync tip. The sync tip to back porch level is invariant with respect to the video information. The amplitude from a porch to the sync tip is approximately (in television transmissions in the United States) 28.6% of the maximum possible peak-to-peak amplitude of the composite wave form. The maximum peak-to-peak amplitude is realized only when the video information swings to the reference white level. The output $V_x$ of this sample average and hold circuit F is at any time the amplitude difference between the sync tip and back porch of the preceding sync tip. This is updated for each horizontal line or 525 times per second.

The following components of sample average and hold circuits D and F correspond to each other and perform the same function except as inherent in the above discussion:

| Circuit D | Circuit F |
|---|---|
| R31 | R36 |
| C15 | C21 |
| U6 | U7 |
| C16 | C22 |
| C17 | C23 |
| U8B | U8C |
| C18, C19 | C24 |
| Q2 | Q3 |
| R33 | R37 |

Resistors R58, R55 and R85 at the inputs of amplifiers U16, U15 and U19 respectively protect those amplifiers from overloads resulting from discharge of condensers C34, C37–C38, and C40–C41, respectively, when the power to television receiver is turned off.

Condensers C35, C39 and C42, between pin 8 and ground of IC's U16, U15, and U19 respectively enhance the dynamic stability of those IC's.

Sample average and hold circuit F having produced an output signal $V_x$, it is next desirable to trace that signal into "singal buffer" F' and to describe the construction and mode of operation of "signal buffer" F'.

The "signal buffer" F' (FIGS. 2 and 6) is an operational amplifier circuit with a gain of about 45. The gain is determined by the ratio of the resistance of resistor R59 to the resistance of resistor R57. Operational amplifier U16 is connected in a standard inverting amplifier configuration except for the fact that several diodes are involved in the circuit. The signal is inputted via R57 and fed out from pin 6.

The inverted composite video is sampled with the sync tip at zero level and the back porch is at some negative level. Hence, the output $V_x$ of sample average and hold circuit F is a negative signal, but since it is inverted by signal buffer F' the output of signal buffer F' is a positive signal. Diode CR12, in conjunction with resistors R60, R61 and R62, constitute a voltage clipper circuit. The purpose of this is to prevent output from signal buffer F' from ever going to zero. The clipper circuit allows signal buffer F' to have an output related to the strength of the composite video signal unless its output voltage falls below approximately 2 volts. At this point, clipper circuit CR12, R60, R61 and R62 limit the voltage at approxiately plus 2 volts, and prevent it from ever going to zero. The purpose of the clipper circuit is that its output voltage is fed to the denominator port of the analog divider J and it is not allowable for this voltage to ever go to zero volts. The reason for this is that the analog divider is trying to divide the voltage at the numerator port of divider J by the voltage at the denominator port. If the denominator port voltage goes too low, the dividend, or output level, becomes very large; in fact, if the denominator port ever got to zero, the analog divider should ideally output an infinite voltage which, of course, it cannot do. Thus, the clipper circuit (CR12, R60, R61 and R62) prevents the denominator port voltage from ever going to a very low level. In normal operation, the level where clipping occurs is never reached. If that voltage did go to a low level it would drive the output of the divider J into a saturated mode. This is undesirable because once the divider J is driven into saturation, there is a possibility that it will either latch up or be slow about coming out of saturation again. This problem is overcome since the voltage clipper circuit CR12, R60, R61, and R62 limits the excursion of the denominator port voltage and prevents it from ever dropping down very close to zero volts. The voltage below which the output of the clipper circuit may not fall is dependent on the relative resistance of resistors R60, R61 and R62.

Buffer F' could be identical with buffer D' but is preferably modified as shown to prevent any possibility of the divider going into saturation. The input to buffer F' is amplified, inverted and feeds the aforesaid clipper circuit CR12, R60, R61 and R62. Diode CR11 produces an increase in the output voltage of amplifier U16 to compensate for the drop in voltage across diode CR12. Thus, temperature changes cause similar voltage drop changes in diodes CR11 and CR12 and they balance out. Normally, the input voltage $V_x$ is negative, and the negative feedback for amplifier and inverter U16 is provided by diode CR10. However, in the event that $V_x$ should ever become positive disconnecting C34 and R59 via CR10, CR11 conducts to provide the required negative feedback for amplifier and inverter U16.

Capacitor C35 provides phase compensation for dynamic stability of amplifier U16. Capacitors C39 and C42 have the same function in connection with amplifiers U15 and U19 respectively.

It is clear that a voltage $V_z'$, or the video noise level analog arrives at the numerator port of the divider J and that a signal dependent on the amplitude of the composite video signal passes from clipper circuit CR12, R60, R61 and R62, through jumper E15, E16 via wire 600 to the denominator port of divider J. This latter signal will be referred to as the video signal level analog. We will next explain how the divider J divides those two signals to produce an output related to the video signal/noise ratio (see FIG. 8).

The analog divider part J divides the numerator port voltage by the denominator port voltage; and also has an inversion function, that is, its output is reversed in polarity. As both input signals are of positive polarity, the output of the analog divider is a negative voltage appearing at terminal 6 of amplifier U18 (type 308). The analog divider circuit J is explained somewhat in the Motorola catalog in connection with the data sheets for the MC1495 integrated circuit.

The analog divider J comprises integrated circuits (IC) U17 and U18 and associated circuitry. IC U17 and its associated circuitry is an analog multiplier while IC U18 and its associated circuitry is an operational amplifier. The multiplier U17 is connected as the feedback element of the operational amplifier. The resulting forward transfer function of the combined circuit is the inverse of that of the feedback element, i.e., the inverse of multiplication or division.

The output of the operational amplifier, U18 pin 6, is connected via the voltage divider R65 and R66, to input pin 4 of the multiplier U17. The other input to the multiplier U17 is to pin 9, which is inputted with the video signals strength analog from buffer F' via the voltage divider R63 and R64.

The differential output of the multiplier U17 is fed (with the proper sense) to the input pins 2 and 3 of the operational amplifier U18. Pin 2 of U18 is the summing junction where the noise level analog is summed with the feedback signal from the multiplier U17. The resulting output at U18 pin 6 can be expressed as $$V_o = -10 \frac{V_z'}{V_x'}$$

where $V_x'$ and $V_z'$ are as denoted by the schematic diagram.

Resistor R68 trims the scale factor in the above equation, i.e., sets the scale factor's absolute value to 10. Resistor R72 and its associated network adjust the offset of the input at pin 4 of IC U17. Resistor R73 and its associated network adjust the offset at pin 9 input of IC U17. Resistors R69, R70 and R71 are used to set various currents in this particular IC to values suitable for the scaling factor of the circuit and the input voltage range at pins 4 and 9. Resistors R79, R80 and R81 provide the pull-up circuit for the open collector output at IC U17 pin 14. Resistors R82 and R83 provide the pull-up circuit for the open collector output at IC U17 pin 2. Resistor R81 adjusts the output offset. Condensor C36 provides frequency compensation for amplifier U18.

The video noise level analog $V_z$, from the noise signal buffer D' is fed to the summing junction, pin 2 of IC U18, via the input resistor R83. This is the numerator port of the divider while the signal strength buffer F' feeds the denominator port. The absolute value of the resulting output $-10(V_z'/V_x')$ is proportional to the video noise level analog to video signal level analog ratio. Therefore, it is ideally directed proportional to the video noise-to-signal ratio or inversely proportional to the video signal-to-noise ratio.

Resistors R63–R64, R65–R66, R74–R76 and R75–R77 are voltage dividers setting the required voltage levels for the unit.

Having explained the division function, we will next discuss the parts fed by the output of divider J.

Figure 9:
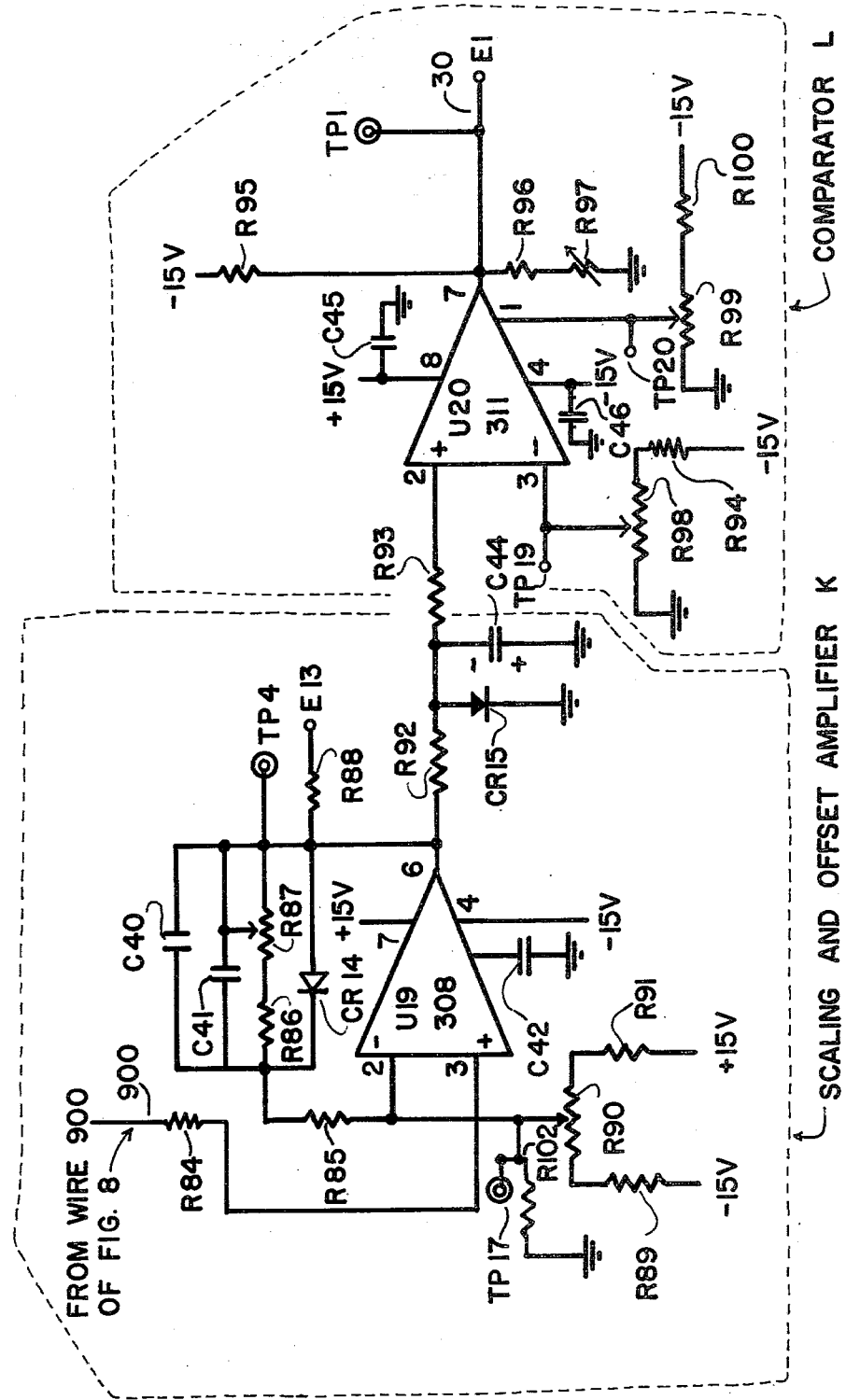
FIG. 9 is a schematic diagram of scaling and offset amplifier K, and comparator L, of FIG. 2.

The output 900 of the analog divider J is fed to pin 3 of amplifier U19 of scaling and offset amplifier K (FIGS. 2 and 9). Since the output from the analog divider J is negative and the amplifier K is non-inverting the signal, the output of amplifier K remains a negative voltage. Amplifier K also provides gain, since a greater voltage swing than is obtained from divider J is desirable. Inverting amplifier K includes an offset circuit which consists of resistors R89 through R91 which feed pin 2 of amplifier U19. Hence, the signal at the output pin 6 of amplifier U19 (type 308) may be adjusted to provide an offset to an extent that it is desirable. The offset is a fixed DC voltage which is added into the output on pin 6 of amplifier U19. The DC level of the output on pin 6 of amplifier U19 may be varied by the adjustment of potentiometer R90.

The low frequency gain of amplifier U19 is determined by the ratio of the sum of the resistances of resistors R85, R86 and R87 to the Thevinen equivalent resistance of the offset network. Diodes C14 and C15 prevent the voltage at C44 from going negative, and either of these diodes may be omitted since its function is performed by the other. This is necessary to insure that under no conditions could a reverse polarity exist across the polarized condenser C44 which might destroy it.

Condensers C40 and C41 roll off the high frequency response of amplifier U19, similar to the function of condensers C37 and C38 in conjunction with buffer amplifier U15.

Condenser C43 filters noise off of the offset correction voltage fed to pin 3 of amplifier U19.

Condenser C44 and resistor R92 form a low-pass filter in conjunction with the output of amplifier U19 to avoid rapid changes in signal level at the input of comparator L.

The output of amplifier K (FIGS. 2 and 9) may be fed directly (with a suitable coupling circuit) to line 30 and thence to the bandwidth control input of voltage tuned filter 23. If such is the case, the output is taken from terminal E13. The control voltage at this point is ideally directly proportional to the video noise-to-signal ratio and, therefore, inversely proportional to the video signal-to-noise ratio (a hyperbolic function of the video signal-to-noise ratio). This function can be modified by the use of a shaping circuit as will be explained later. When the output at E13 is fed to line 30, the bandwidth of the VTF will be continuously controlled when the video signal-to-noise is below a selectable threshold providing that it has not dropped so low as to drive the amplifier K into saturation (which occurs below a usable video signal-to-noise ratio). In the present illustration of the invention, we have elected to utilize only two different bandwidths of voltage tuned filter 23. The wider bandwidth will pass the entire spectrum of the intelligence on the composite video signal. The other bandwidth is narrow enough to pass most of the intelligence but reject sufficient noise to improve the signal-/noise ratio as compared to what said ratio would be at said wider bandwidth. To achieve automatic selection of the desired one of these two different bandwidths analog comparator circuit L (FIGS. 2 and 9) has been added.

Amplifier K feeds analog comparator L the output (designated E1) of which is capable of being in two states (a high state and a low state). Hence, it is a binary type output. The comparator L has a threshold which is set by potentiometer R98, which sets a reference voltage into pin 3 of amplifier U20 (type 311). The output signal from amplifier K is fed via the low-pass filter comprised of R92 and C44 through R93 into pin 2 of U20. When the voltage at pin 2 of analog comparator U20 is more positive than the voltage at pin 3 of comparator U20, then the output on pin 7 is internally disconnected from pin 1 of U20. The voltage at pin 7 of comparator U20 is then determined by the voltage division effected by resistor network R95, R96 and R97. This is the high level state (more positive level) and its voltage can be adjusted by adjusting variable resistor R97 which is adjustable over approximately a 2 volt range. If the input voltage to comparator L drops to an extent where the voltage of pin 2 of amplifier U20 is less than the voltage of pin 3 of amplifier U20, the amplifier U20 switches states and goes into state we call the low level output state (more negative level) in which pin 7 of amplifier U20 is internally connected to pin 1 of amplifier U20. This results in the output voltage at pin 7 being determined by the voltage divider network consisting of R95, R96, R97, R99 and R100. This causes the output voltage to be more negative than it was for the other state. R97 has a minimal effect on this output voltage level and the level can be adjusted by adjusting R99 to produce the desired VTF bandwidth corresponding to this state. Hence, amplifier L outputs two levels, a high level and a low level. Whether the level is a high one or a low one is dependent on input voltage fed to amplifier L from amplifier K.

The threshold level where the switching occurs is set by potentiometer R98 which sets the reference voltage at pin 3 of amplifier U20. Adjusting potentiometer R98 controls the input voltage level from amplifier K that is required to switch from the high level output state to a low output state of output voltage E1. These two levels are adjusted to give the desired bandwidths at the voltage tuned filter 23 as previously explained. The low level (more negative) output on E1 selects the narrow bandwidth state of voltage tuned filter 23, and the high level (more positive) output on E1 selects the wider bandwidth state of voltage tuned filter 23. The high level value of voltage E1 can be adjusted by variable resistor R97 to select the width of the band when the voltage tuned filter 23 is in its "wide" bandwidth state; and the low level value of voltage E1 can be adjusted by potentiometer R99 to select the width of the band of voltage tuned filter 23 when it is in its "narrow" bandwidth state.

Having explained the apparatus in blocks A to F, D', F' and J to L, we will next explain the sync separator G and the timing circuitry H shown in FIGS. 2 and 10. The main function of timing circuit H is to provide switch B and the sample and hold circuits D and F with timing signals as will appear.

Sync separator G comprises a transistor U9A, an RC network C25, C26, C27, and R39, R40, and R41, and operates to separate the sync pulses from the video information so that it outputs a pulse train of sync pulses at logic levels which will be used to trigger components of timing circuitry H. Sync separator G is inputted with the inverted clamped composite signal which is outputted from clamped amplifier A. This signal is shown on the wave form diagram (FIG. 2A) and comprises the horizontal sync tip M, back porch M1, color burst M2 and video M3. The peak signal in this wave form is always a sync tip. The sync tip is coupled into the base (pin 2) of transistor U9A through an RC network C25, C26, C27 and R40. The horizontal sync tip will cause base current to flow and charge capacitors C25, C26 and C27. These capacitors C25 to C27 develop a negative bias at the base (pin 2) of transistor U9A. Transistor U9A is self-biasing, according to the signal level. It will bias itself so that the transistor U9A will not conduct except on peaks of the input signals, which in this case are the horizontal sync tips. Transistor U9A is held in a non-conducting state by the negative bias produced by C25 through C27 and is held in this state until a sync tip arrives and causes it to go into conduction. When transistor U9A is turned off a voltage of +5 volts appears at its collector via resistor R42. When transistor U9A is turned "on" the collector voltage is pulled to ground. Hence, the output voltage from transistor U9A is a series of negative going pulses with each pulse going from 5 volts down to zero level. They remain at zero level for the duration of the sync tip which is normally about 4.75 microseconds. The signal at the collector of transistor U9A may be called the separated sync tip signal. This constitutes the output of sync separator G, and appears at pin 1 of transistor U9A.

Timing circuits H consist primarily of "one shot" circuits. Each one shot is one-half of an integrated circuit such as U10, U11 and U12. For example, U10 consists of two one shots, U10A and U10B, respectively. Each and every one of the one shots may be triggered by either (1) a negative leading edge inputted at either its pin 5 or its pin 11, depending on which section of the IC is used; or (2) a positive going leading edge at either pin 4 or pin 12 of the one shot. The time-out period of one shots is determined by the product of R and C in its timing circuit. For example, in one shot U10B the time constant is determined by the product of the capacity of condenser C29 and resistor R45's resistance. The time constant of the one shot is approximately one-third of the RC time constant.

One shot U10B has a time constant very close to 3.8 microseconds, and is triggered by a negative going edge of the separated sync signal (from pin 1 of transistor U9A), inputted at pin 11 of one shot U10B. This negative going leading edge of the separated sync signal causes one shot U10B to "time-out" a pulse. Pin 9 of one shot U10B is one of its two complementary outputs and pin 9 is normally in a high level state producing a logic 1 signal (which is a level in the 2.5 volt to 5 volt range), except during the time-out period when it goes to logic zero state (which is approximately zero volts in this case). Pin 9 of one shot U10B is outputting a negative going pulse of about 3.8 microseconds (determined by resistor R45 and condenser C29). This pulse is fed to pin 1 of logic element U14B. This is a logic inverting circuit which takes the negative going pulse at one shot U10B, pin 9, and inverts it so it becomes a positive going pulse at pin 2 of logic element U14B. This positive going pulse is fed through resistor R22 and to input pin 3 of transistor switch U9C, the output of which drives FET switch U3B. FET switch U3B is controlled (whether it is in an "off" or in an "on" state) by the voltage at its pin 5 and this is produced by transistor switch U9C.

Hence the output (pin 9) of one shot U10B is coupled through logic element U14B into switch driver U9C to "turn on" and "turn off" FET switch U3B. Also, the output (pin 2) of logic element U14B is fed onto pin 3 of inverter U14A which is another logic inverter. It drives a transistor U9B which controls the analog switch U3A. Switch driver U9B outputs a control voltage to pin 13 of analog switch U3A. The control signal from logic element U14B is fed directly into switch driver U9C; however, it is inverted by inverter U14B before it is fed into switch driver U9B. This inversion at logic element U14A causes switch driver U9B to be turned off, when the signal is such as to turn switch driver U9C on and vice versa. Similarly, when switch driver U9B is turned on, switch driver U9C is turned off, and this inversion of the switch actions is caused by inverters U14A and U14B putting 2 inversions in front of switch driver U9B whereas switch driver U9C does not have that inversion effected by U14A. In this way, switch U3A switches on when switch U3B is off; this being considered a switch closure for switch B (FIGS. 2 and 4) since a signal passes U3A, between pins 1 and 2; whereas switch U3B is an open circuit. However, in an opposite state switch U3A will be open and switch U3B (pins 3 and 4) is shorted so that the analog signal coming into switch B (FIGS. 2 and 4) sees an open circuit in switch U3A and any signal which is capacitively coupled across switch U3A is shorted to ground by switch U3B.

Summarizing the last two paragraphs, it is noted that the actions of switches U3A and U3B are controlled by one shot U10B. Pin 9 of one shot U10B is normally in a logic 1 state holding switch U3A off and switch U3B closed. This prevents the flow of signals to precision rectifier C (FIGS. 2 and 4) and beyond. However, when the leading edge of a separated sync signal arrives at pin 11 of one shot U10B, that one shot goes to a logic 0 at its output pin 9, for 3.8 microseconds. During this period the logic zero at this pin 9 closes switch U3A and opens switch U3B (see the third and fourth timing waves of FIG. 2A) allowing noise signals to pass switch B (FIGS. 2 and 4) to the precision rectifier C (FIGS. 2 and 4), and beyond, for the first 3.8 microseconds of the 4.75 microsecond horizontal sync signal.

We will next explain how the control voltage, which controls the sampling of the clamping circuit A, is produced. The sample control voltage that is used to cause the clamping circuit A to sample, is also used to cause the noise "sample average and hold" circuit D to sample the noise. One shot U10B feeds, in addition to what has been described before, integrated circuit U14C which is a logic inverter. When one shot U10B times-out a pulse, it produces a negative pulse of about 3.8 microseconds at its pin 9. This pulse is inputted to logic inverter U14C and causes the output of logic inverter U14C to tend to rise to a logic 1 level and would in fact go to a logic 1 level if logic inverter U14D was also tending to go to that level. However, if logic inverter U14C tends to go high, it may nevertheless fail to do so if logic inverter U14D remains at a low level. Therefore, let us look at the input to logic inverter U14D at this time. U14D's input is produced at one shot U12B, pin 10. This is a one shot which has a time constant of approximately 8/10 of a microsecond (determined by resistor R53 and condenser C33); see pulse P of the fifth timing wave of FIG. 2A. This positive pulse is fed to the input (pin 11) of logic inverter U14D and this holds the output of U14D down to a logic 0 for 8/10 of a microsecond. However, at the end of the time-out period for one shot U12B, the input of logic inverter U14D goes to logic 0 which allows its output to go to logic 1. This allows logic 1 to appear at the junction point of the outputs of one shots U14C and U14D. This logic 1 is fed through resistor R14 (FIG. 3) into the transistor switch U8A. A logic 1 level at resistor R14 allows transistor U8A to turn on and allows amplifier U2 to be gated on which causes amplifier U2 to sample the output of amplifier U1. The waveform of this signal is the sixth timing waveform on FIG. 2A and comprises a pulse Q which is 3 μs, followed by zero volts. Thereupon the clamp circuit A is enabled, and also the noise sample average and hold circuit D is enabled (via the wire from pin 8 of logic inverter U14D to resistor R32), allowing them to go into the sample mode for approximately 3 microseconds during the horizontal sync portion of the composite waveform. During this 3 microseconds, clamp circuit A samples and stores clamping information, while the noise "sample average and hold" circuit D is allowed to sample the noise at the output precision rectifier C and hold it as the voltage $V_z$. The reason that the first 0.8 μs of the 3.8 μs pulse is held to produce the 3 μs command pulse is to ensure that those signals being sampled have fully settled before the sample is taken. In the case of the clamped amplifier A, it allows the sync pulse 0.8 μs for any overshoot or undershoot to settle before it is sampled for 3 μs. In the case of the noise sample, average and hold amplifier D, it allows 0.8 μs for any switching transient introduced by switch B and coupled through the rectifier C to dissipate before the rectified noise is sampled.

We will next show how the sample control voltage for sample average and hold circuit F is produced. Sample average and hold circuit F samples the back porch M1 of the composite waveform (FIG. 2A) for 2.35 μs.

The back porch M1 (FIG. 2A) includes a color burst M2. This color burst M2 is removed by filter E so that the back porch now is a clean signal. The sync tip M is at zero or ground level due to the fact that it has been clamped to ground. So now sample average and hold circuit F is going to sample the back porch level. It will sample it by a pulse which is labeled T (FIG. 2A). This pulse is about 2.35 microseconds in duration and it occurs during the back porch period.

We will next show how pulse T (FIG. 2A) is produced. One shot U11A has a time-out period of 6 microseconds. The 6 microseconds is determined by the time constant of resistor R46 and capacitor C30. One shot U11A is triggered at pin 5. This is fed by the separated sync signal from sync separator G. The negative edge of this separated sync signal comes from pin 1 of transistor U9A and is active in triggering one shot U11A. This causes one shot U11A to time-out or produce a positive pulse, at its pin 6, which has been labeled R on the timing wave diagram of FIG. 2A. This positive pulse has a duration of 6 microseconds. It is fed to one shot U11B pin 11. This pin 11 is triggered by the negative edge (the trailing edge) of the waveform R (FIG. 2A). So now, one shot U11B is triggered approximately 6 microseconds after the leading edge of the separated sync pulse. One shot U11B is triggered in the back porch period of the composite signal. One shot U11B has a time-out period of approximately 2.35 microseconds, a period determined by condenser C31 and resistor R47. One shot U11B has an output (pin 10) fed, via 500, to resistor R38 of sample average and hold circuit F. When the output is a logic 1, it applies an input to pin 12 of transistor switch U8C which causes that switch to turn on which in turn gates amplifier U7 on for the "sample" period (2.35 μs) of the sample average and hold circuit F.

The timing of pulse T (FIG. 3) is such that that pulse, as well as the last-named sample occurs in the middle of the back porch portion M1 of the composite signal.

The one shot U12A is fed at its pin 5 by the signal from one shot U11A pin 7. The signal on pin 7 of one shot U11A is not shown on the waveform diagram; however, its waveform is the same as the waveform designated R except it is inverted. In other words waveform R appears at pin 6 of one shot U11A and the waveform at pin 7 of one shot U11A is the complement of this, or R (FIG. 2A) inverted. Pin 7 of one shot U11A normally produces a signal which goes to zero for 6 microseconds following the leading edge of the separated sync signal from pin 1 of transistor U9A. It stays at zero for 6 microseconds and then it rises. However, the negative edge of this signal at pin 7 of one shot U11A triggers one shot U12A, being applied to pin 5 thereof. This triggers one shot U12A. One shot U12A has a time constant of about 56 microseconds and it is determined by the time constant of resistor R51 and condenser C32. One shot U12A pin 6 has an output that is normally at a logic zero level. During the 56 microsecond time-out period of one shot U12A, it rises to logic 1 level. This is shown by the waveform designated U on FIG. 2A. Pin 6 of one shot U12A is normally at a logic zero. After one shot U12A is triggered, its output rises for 56 microseconds. This signal is fed to one shot U12B pin 12 and also fed to one shot U11A pin 4 and it is also fed to one shot U10B pin 12. At these ports, a logic 1 inhibits those one shots from being triggered. For the 56 microseconds that pin 6 of one shot U12A is at logic 1, one shots U12B, U11A and U10B are inhibited from being triggered. This function locks out those three one shots for 56 microseconds. This was done so that any noise that might be on the separated sync signal line (pin 1 of U9A) cannot be effective triggering these three one shots. Normally if the separated sync signal (which is waveform N of FIG. 2A) is a clean signal, no lock out would be needed. But if there is noise on this signal, the three one shots U12B, U11A and U10B should be locked out so that they are not triggered by that noise. They are locked out for 56 microseconds and then they are enabled again so that the next separated sync signal is capable of triggering these one shots. The function of one shot U12A is a lock-out circuit which locks out or inhibits certain other one shots so that they cannot be triggered by noise during the period when they should not be operated. The lock-out pulse ideally would be slightly less than the 63.5 $\mu$s quiescent state of the separated sync pulses. The actual pulse is 56 $\mu$s. This leaves about 7.5 $\mu$s when the one shots being locked out are not protected. The 56 $\mu$s nominal pulse width was chosen to ensure that under worst case circuit conditions this pulse could never exceed the 63.5 $\mu$s period to over-run the following pulse. This technique is well known and has been adopted in different logic circuits, but not in a television receiver much less in one such as is here involved.

Included in the composite video signal are some pulses that occur during the vertical retrace time. A series of horizontal sync pulses occur for nearly 1/60 of a second and at the end of this time, the normal pattern used on the composite video waveform is broken up and several pulses are added into the waveform. This is the vertical retrace time. They are not shown in any of the waveforms of FIG. 2A. However, during the vertical retrace some pulses appear on the composite video signal called equalizing pulses. These pulses are of the same amplitude but shorter than horizontal sync tip pulses. Equalizing pulses are approximately of a duration of 2.5 microseconds. There is a problem with the fact that sync separator circuit G cannot differentiate between sync tips and equalizing pulses so that on occasions, during the vertical retrace time, sync separator G outputs the unwanted equalizing pulses as a result of the equalizing pulses on the composite video signal. They are unwanted since a series of them may cause the sampling circuits (switch B and sample average and hold circuit D) to operate even though the sampling circuits should not operate at this time. Hence, one shot U10A and flip-flop U13 are employed to produce an inhibit signal to lock out the separated equalizing pulses, so they must differentiate between separated equalizing pulses and separated horizontal sync pulses. The only way that they can do that is by the differences in the pulse widths between wanted (separated sync) pulses and unwanted (separated equalizing) pulses. The separated sync pulse or the horizontal sync pulse is approximately 4.75 microseconds wide. A separated equalizing pulse is 2.5 microseconds wide. One shot U10A has its pulse out time determined by the time constant of capacitor C25 and resistor R43 resulting in a time constant of about 3.6 microseconds. One shot U10A is triggered by the leading edge of the separated sync signal; that is, the separated sync signal from sync separator G is fed into pin 5 of one shot U10A. This negative (leading) edge triggers one shot U10A. One shot U10A produces a negative going pulse at its pin 7 during its time-out period of approximately 3.6 microseconds. This negative pulse is fed to pin 3 which is the trigger input of flip-flop U13.

One shot U10A and the D type flip-flop U13 comprise a circuit which detects "equalizing" pulses. The D type flip-flop is a storage element with a data input at its pin 2 which is fed by the sync separator and a trigger input at its pin 3 which is fed from the pin 7 output of one shot U10A. The D flip-flop when triggered by the positive going edge of a pulse goes to the state which outputs at its pin 7 the complement of the logic input at its pin 2. It holds this logic output and will not respond to its pin 2 input until it is again triggered by a positive going edge of a pulse.

Pin 2 of flip-flop U13 is fed by the separated sync separator G. Flip-flop U13 is triggered on pin 3 by the positive going edge of the output of one shot U10A, so that it is triggered at the end of the 3.6 microseconds (which is the time-out period of one shot U10A). If a pulse emitted from the sync separator G is a true sync tip pulse, it will have a duration of about 4.75 microseconds so that when pin 3 of flip-flop U13 is triggered by pin 7 of one shot U10A, the sync pulse will be at logic zero level (down). This causes flip-flop U13 to output a logic 1 at its pin 6, the complement of the logic 0 at its D (pin 2) input when triggered. This logic 1 level is fed to one shot U10B pin 13; also it is fed to one shot U12B pin 13 and enables these two one shots. It enables them (U10B and U12B) because the separated sync signal N (FIG. 2A) has a duration greater than 3.6 microseconds which was produced by one shot U10A which caused flip-flop U13 to output a logic 1 and enables these one shots U10B and U12B.

However, a separated equalizing pulse, being less than 3.6 $\mu$s long, will pass to pin 2 of flip-flop U13, but flip-flop U13 is not triggered on its input pin 3 by a signal from pin 7 of one shot U10A during the 2.5 $\mu$s that the separated equalizing pulse occurs. Therefore, if the signal out of sync separator G is an equalizing pulse, it will be only 2.5 microseconds wide and the 2.5 microseconds will expire before flip-flop U13 is triggered on its pin 3. Flip-flop U13 is triggered 1.6 $\mu$s later by a positive going edge at its trigger input (pin 3), and it will output a zero level at pin 6 since the pulse at the D input has expired and a logic 1 level is left there. This zero level at pin 6 is fed to one shot U10B pin 13 and also to one shot U12B pin 13 which are reset inputs. The logic zero at these inputs places these two one shots U10B and U12B in a reset state and effectively inhibits these two one shots, so that these one shots cannot be triggered by subsequent pulses of a string of equalizing pulses which comes along. Thus, the first equalizing pulse causes element U13 to go to a logic 1 state and its output from its pin 6 is a logic zero which inhibits one shots U10B and U12B from being triggered by any equalizing pulses which follow. This prevents the sampling circuits A, B and D from being caused to sample by equalizing pulses which otherwise would result in erroneous samples as is explained later.

The sampling circuit F is allowed to be commanded to sample by equalizing pulses. No error is introduced by these samples since they normally are samples of the back-porch level (or blanking level) and the composite signal assumes this level following the equalizing pulses.

The first equalizing pulse of a series of equalizing pulses (six) inadvertently gets through to the sampling circuits. This is because the inhibiting circuit U10A/U13 requires 3.6 $\mu$s to determine that the pulse was an equalizing pulse and to activate an inhibit line which the following 5 equalizing pulses keep activated. However, the first equalizing pulse triggers the one shots affected before the inhibit line was activated. This causes an erroneous sample to be made by each of the sampling circuits of A, B and D. Similarly, most of the first separated sync pulse following a series of equalizing pulses is lost as a result of the time required (3.6 μs) to determine that it is not an equalizing pulse and to remove the sample inhibit signal from the sampling circuits of A, B and D. The total error that the erroneous samples introduce in the control voltage outputted from the VTF control circuit (on wire 30) is less than 1%.

Resistors R48, R49 and R52 apply logic 1 signal levels to direct "set" (or "reset" inputs as the case may be) of elements U11A, U13 and U12A respectively to disable the direct "set" or "reset" functions which are not required in this application. Resistor R50 is a pull-up resistor for the open collector outputs of one shots U14C and U14D.

It is desirable to inhibit the sampling of the clamped amplifier's output by U2/Q1 since it is desirable only to sample the sync tip level. The equalizing pulse tips are at the same level. The problem occurs in that the sample taken is for a duration of most of the sync pulse's duration and, since the equalizing pulse is much shorter, the sample would over-run the duration of the equalizing pulse and thus include part of the back porch level in the sample. This induces an error which would tend to clamp the average signal level during the sync tip to a level slightly below ground.

The switch U3A is also inhibited from operating as a result of equalizing pulses, since this switch when operated will close for the period of most of the sync pulse duration. If it were operated by an equalizing pulse, the switch's closing would over-run the duration of the equalizing pulse and include a portion of the back porch.

The back-porch level even if passed by the switch B is negative and should be excluded by the following rectifier circuit. However, the rectifier's speed limitation would allow a short spike to pass corresponding to the rapid and relatively large negative-going excursion of the equalizing pulses' trailing edge. The positive spike would algebraically add to the negative rectified noise when averaged by the sample, average and hold circuit, U6/Q2, including an error in the averaged noise signal.

Summarizing the operation of the timing circuits H, it is noted that the leading edge of the output of sync separator G triggers one shot U10A which then produces an output pulse of 3.8 μs duration. This output operates switches U3A and U3B so that only a portion of the horizontal sync tip (without the back porch or any of the video intelligence) passes through switch B to rectifier C. The output of sync separator G also triggers one shot U12B which emits an output pulse of 8/10 microsecond duration.

This pulse is used to hold off the first 0.8 μs of the 3.8 μs pulse produced by U10B. This is accomplished by the operation of U14C and U14D and results in a 3 μs pulse. This is fed to U8A and turns on this transistor to enable U2 of the clamped amplifier A. This allows U2 to sample the sync tip to ground level at the output of U1, amplify this level to increase or decrease the existing charge on the storage element C7. FET Q1 is a voltage follower which buffers C7 and outputs the voltage across C7 to the summing junction of U1. This is a negative feedback which adjusts the DC level of the output to maintain the sync tips at virtual ground. The 3 μs sample command pulse from U14C and U14D is also fed to U8B which controls the sample, average and hold circuit D and commands it to sample the rectified noise voltage level from the rectifier C and to time weight average it with past samples.

The timing circuits H also samples the back porch M1 (FIG. 2A) by operating one shot U11A to produce a 6 μs delay pulse, the trailing edge of which triggers one shot U11B which puts out pulse T (FIG. 2A) which occurs in the center of back porch M1. This pulse T is fed to pin 10 of transistor U8B to cause "sample average and hold" circuit F (FIG. 2) to sample the amplitude of the back porch M1 and produce an output directly related thereto.

Other one shot circuitry, within timing circuits H, render a number of one shots inoperative during the 50 μs period of the video intelligence signals to prevent possible unwanted operation of them by equalizing pulses.

We will next provide a summary of the operation of the schematic drawings of FIGS. 3 to 10.

The composite video and synchronizing signal from the receiver's video amplifier is fed to a clamped amplifier A, of FIGS. 2 and 4. This stage inverts the composite signal (this is not necessary but is indigenous to this type of circuit) and clamps the positive peaks of the waveform (the horizontal sync tips) to ground level. The composite signal and hence sync pulse tips normally have noise riding on them.

The clamp circuit A clamps the average value of the sync tips to ground level. The time constant of the averaging circuit is long with respect to the periods of the noise frequency components so that the time-weighted average of the noise voltage statistically tends to zero. For this reason, the noise riding on the composite signal (and hence sync tips) has negligible effect upon the clamping of the sync tips.

The output of clamping circuit A feeds switch B which is a switch to pass only the sync tip portions of the composite signal's waveform to rectifier C. (Switch B is necessary only to prevent the relatively large swings of the video from reaching and overloading subsequent amplifiers and otherwise is not required). Rectifier C is a precision rectifier. Since the sync tip portion of the clamped composite signal's waveform is passed to rectifier C, and since the average value of the sync tip is clamped to ground, only the noise riding on the sync tip appears as an effective signal at the input to rectifier C. The noise is rectified and passed to sample and hold circuit D.

Sample, average and hold circuit D averages the rectified noise over the sampling time and holds it at its output until it is updated by the averaged succeeding sample during the next sync pulse (next horizontal line). This voltage level is proportional to the noise riding on the composite (and hence video) signal.

The clamped amplifier A feeds filter E which is a trap to remove the color burst (if it is present) from the composite signal. The color burst, when present, occurs during the back porch portion of the composite signal's waveform. The color burst is removed so that the back porch is clean and is at the blanking level. The difference between blanking and sync tip levels is a constant ratio of the composite (and hence video) signal's maximum amplitude. The blanking level (during the back porch of the waveform) is sampled, averaged over the sampling time, and held for each horizontal line. Since the sync tip level is clamped to zero, the blanking level (with respect to ground) is a fixed ratio of the composite waveform's amplitude.

The averaging is a weighted time averaging having a time constant such that past samples are effective in determining the average at any time. This tends to minimize the effects of noise riding on the signal (the same phenomenon that nullified the effects of noise on the clamped amplifier).

The output of sample average and hold circuit F is a voltage level which is proportional to the composite signal's maximum amplitude. This is fed to the analog divider J, into the denominator port while that level proportional to the noise level (from sample average and hold circuit D) is fed to the numerator port. The absolute value of the divider's output is ideally a direct function of the noise-to-signal ratio of the composite signal and, therefore, an inverse function of the signal-to-noise of the composite and hence video signal. This is fed to a scaling and offset amplifier K.

This amplifier K has an output control voltage which is a function of the video noise-to-signal ratio. This control voltage may be controlled to some extent. Shaping of the control voltage could be effected at this point if it were necessary. This modification of the control voltage may be desirable when the voltage tuned filter is driven directly from this point.

FIGS. 2 and 9 show amplifier K feeding an analog comparator L. This has a two-state output—a high and a low level which drives the voltage tuned filter 23 via wire 30 (FIG. 1). A reference voltage is set by potentiometer R98 which feeds the comparator L. When the noise-to-signal ratio signal level is more negative than the reference level, the comparator's output assumes a low level state corresponding to a narrow voltage tuned filter bandwidth. Conversely, when the noise-to-signal ratio signal voltage is more positive than the reference level, the output assumes a high level state and the bandwidth is wide.

The output voltage from comparator L is fed to the voltage tuned filter (VTF) 23. This circuit is operated in cascade with the receiver's IF amplifier stages. It is effective in contributing to the bandwidth shrinkage of the IF chain (and hence to that of the receiver). The VTF 23 when operated at its wider bandwidths, has a small contribution to the bandwidth shrinkage. When operated in its narrow bandwidth region, it has a large effect on the IF bandwidth causing a bandwidth shrinkage.

The bandwidth of VTF 23 varies in inverse proportion to the absolute value of the applied control voltage (the control voltage for the circuits shown is negative). When the analog comparator L is employed to drive VTF 23, a high noise-to-signal ratio results in a high negative output from the comparator producing a narrow bandwidth at VTF 23 and hence a narrow receiver bandwidth. Conversely, a low noise-to-signal ratio results in a less negative level output from the comparator L and a corresponding wide bandwidth of VTF 23 and hence, a wide receiver bandwidth. The analog comparator L can be eliminated and VTF 23 driven directly from amplifier K or a shaping circuit following amplifier K. In this manner, the receiver's bandwidth is made to vary continuously as a function of the video noise-to-signal ratio over part of or all of the noise-to-signal range.

The VTF control circuit, as is characterized by the circuit diagrams herein, can interface directly with the VTF of the Balbes U.S. Pat. No. 3,633,119 referred to above. This is true when the output is taken from either E13 (part K's output) or E1 (part L's output). Both outputs are negative as is the input required by the VTF and can be adjusted to produce the desired VTF bandwidths. The VTF transfer function expresses the bandwidth as nearly a linear function of the control voltage. When the VTF is fed from E13 of the VTF control circuit, the overall bandwidth vs video noise-to-signal ratio is nearly a linear function. This results in the bandwidth as a function of video signal-to-noise ratio being a hyperbolic function. It may be desirable in some cases to operate the system with the bandwidth varying as a linear function of the video signal-to-noise ratio. This can be achieved by interchanging the signals inputted to the analog divider J's numerator and denominator ports so that the divider outputs an analog of the video signal-to-noise ratio. This would be accomplished by connecting wire 600 to R83 (in place of R63) and wire 608 to R63 (in place of R83). Then the video signal level analog (Vx' on wire 600) is fed to the numerator port (at R63) while the video noise level analog (Vz' on wire 608) is fed to the denominator port (at R63). Other than this change, the circuit configuration would remain the same although some resistor values should be changed to readjust signal levels as required. When the VTF is controlled from the E1 output of the VTF control circuit (bandwidth switched to one of two possible preset values), the switching can be made to occur at the same video signal-to-noise ratio regardless of whether the analog divider J is outputting a signal-to-noise ratio analog or a noise-to-signal analog. However, the divider is more accurate when it is operated to output the video noise-to-signal analog (as it does in the configuration shown). This is because it is more accurate when the denominator signal is relatively high and since the composite input signal to the VTF control circuit is maintained with only small variations in the composite signal level as a result of the receivers AGC, the signal level variations are much less than the noise. As a result, the signal has less level variations than the noise and can be applied at a higher nominal level than the noise to the divider. For this reason, when the comparator L is used to drive the VTF, it is advantageous to connect the divider J such that it outputs a noise-to-signal ratio analog.

The system could be made to work with a positive control voltage from the VTF control circuit to the VTF with the voltage being approximately directly proportional to the video noise-to-signal ratio. Various changes in the circuit configurations of both the VTF control circuit and the VTF would be required. However, the bandwidth vs video signal-to-noise ratio would be the same as before and the system so modified would be fully equivalent to the original system.

Figure 11:
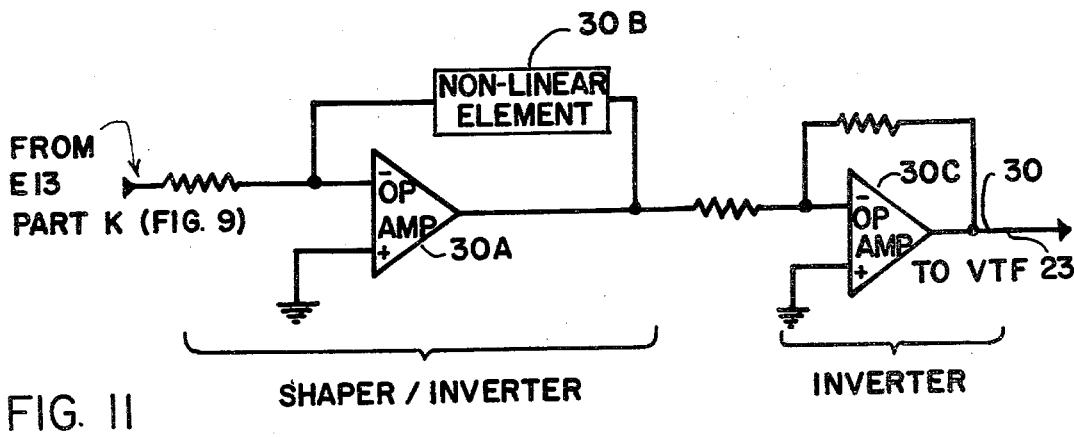
FIG. 11 is a schematic diagram of a possible connection between the output of scaling and offset amplifier K and the voltage tuner filter 23, which, in a modified form of the invention, may be substituted for comparator L (FIGS. 2 and 9).
Figure 8:
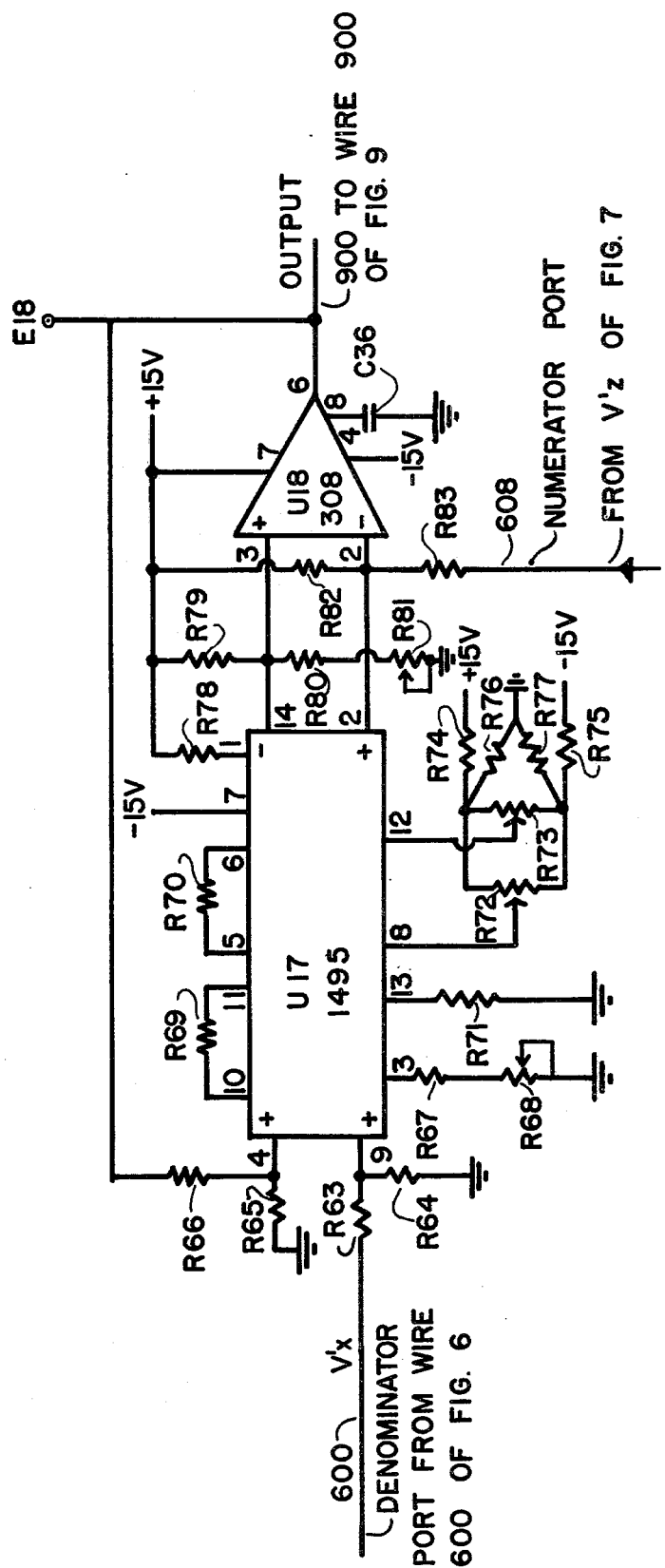
FIG. 8 is a schematic diagram of divider J of FIG. 2.

As mentioned earlier, when the VTF is interfaced with the VTF control circuit in such a way as to provide continuous bandwidth control over a given range of the video signal-to-noise ratio, it may be, in some cases, desirable to shape the VTF's transfer function so as to modify the VTF's bandwidth vs video signal-to-noise ratio function. This could be done by outputting amplifier K to a shaping circuit to modify the transfer function. FIG. 11 shows a generalized circuit which would achieve the shaping. In this circuit, the non-linear element 30B is in a negative feedback circuit around the operational amplifier 30A. As a result, the transfer function of the resulting circuit has a negative gain factor and a factor which is the inverse of the non-linear elements transfer function. The non-linear element may be one having a continuous transfer function such as an analog multiplier or one having a discontinuous function such as a resistor-diode network. The latter network can be used to approximate a desired continuous transfer function by having the network configured to produce piece-wise continuous functions, i.e., the function consisting of several continuous segments in which the function is redefined in each. These shaping techniques are well known. The second amplifier in FIG. 11 is used to reinvert the signal if desired before applying it to the VTF.

We claim to have invented:

1. In a receiver,
   bandwidth control means for varying the bandwidth passed by said receiver and including an input for receiving a control signal to vary said bandwidth,
   signal responsive means responsive to signal strength of signals in said receiver, said signal responsive means having an output,
   noise responsive means responsive to noise in said receiver, said noise responsive means having an output, and
   control means responsive to both said signal responsive means and said noise responsive means for controlling said bandwidth control means to reduce the receiver bandwidth in response to reduction in the signal-to-noise ratio,
   said control means including a divider for dividing one of said outputs by the other to produce said control signal for controlling said bandwidth.

2. A receiver as defined in claim 1 in which:
   said receiver is a television receiver which includes circuitry that will receive a sync signal,
   said noise responsive means comprising means responsive to those noise signals, which occur at a rate so high that a plurality of them occur on individual sync signals, whereby said noise responsive means is responsive to noise in said receiver.

3. In the receiver of claim 1:
   said receiver being superheterodyne television receiver means for frequency modulated video intelligence comprising a series of stages including an I.F. stage followed by said bandwidth control means followed by a limiter followed by video circuits,
   said "signal responsive means", said "noise responsive means" and said "control means" being associated with said video circuits and comprising means for controlling said bandwidth control means to reduce its bandwidth in response to reduction in the signal to noise ratio in said video circuits.

4. In the receiver of claim 3:
   said control means including threshold means for establishing a signal to noise ratio threshold above which reduction in the signal to noise ratio does not reduce said bandwidth.

5. In the receiver of claim 4:
   said control means producing a control signal that varies in one or more steps when the signal to noise ratio is reduce below said threshold.

6. In a receiver,
   bandwidth control means for varying the bandwidth passed by said receiver,
   signal responsive means responsive to signal strength of signals in said receiver,
   noise responsive means responsive to noise in said receiver, and
   control means responsive to both said signal responsive means and said noise responsive means for controlling said bandwidth control means to reduce the receiver bandwidth in response to reduction in the signal-to-noise ratio,
   said receiver being a television receiver which includes circuitry that will receive a sync signal followed by a back porch,
   said signal responsive means comprising means responsive to the difference in signal levels between the sync signal and the back porch, whereby said signal responsive means is responsive to the signal strength of the signals in said receiver.

7. A receiver as defined in claim 6 in which:
   said means responsive to difference in signal levels between the sync signal and the back porch including means for clamping the sync signal to a datum and determining the difference between the signal levels of said datum and said back porch.

8. A receiver as defined in claim 7 in which said last-named means clamps the tip of said sync signal to ground which constitutes said datum.

9. A receiver as defined in claim 7 which said signal responsive means includes filter means for removing any color burst on the back porch, said signal responsive means being responsive to the differences in level between said sync signal and said back porch after any color burst has been removed from the back porch.

10. A receiver as defined in claim 9 in which said signal responsive means includes means to average the difference between the sync signal and its complementary back porch for a plurality of sync signals and delivering an output to said control means based on said average.

11. In a receiver,
    bandwidth control means for varying the bandwidth passed by said receiver,
    signal responsive means responsive to signal strength of signals in said receiver,
    noise responsive means responsive to noise in said receiver,
    control means responsive to both said signal responsive means and said noise responsive means for controlling said bandwidth control means to reduce the receiver bandwidth in response to reduction in the signal-to-noise ratio,
    said receiver being a television receiver which includes circuitry that will receive a sync signal,
    said noise responsive means comprising means responsive to those noise signals, which occur at a rate so high that a plurality of them occur on individual sync signals, whereby said noise responsive means is responsive to noise in said receiver,
    said noise responsive means including:
    (a) a rectifier for rectifying said noise signals that occur on the sync signals, and
    (b) means for averaging the rectified noise signals that appeared on a plurality of said sync signals to provide an output of said noise responsive means,
    said control means being responsive to said last-named output.

12. In a receiver,
    bandwidth control means for varying the bandwidth passed by said receiver, signal responsive means responsive to signal strength of signals in said receiver, noise responsive means responsive to noise in said receiver, control means responsive to both said signal responsive means and said noise responsive means for controlling said bandwidth control means to reduce the receiver bandwidth in response to reduction in the signal-to-noise ratio, said receiver being a television receiver which will receive a sync signal followed by a back porch, said signal responsive means comprising means responsive to the difference in signal levels between the sync signal and the back porch, and said noise responsive means comprising means responsive to those noise signals which occur at a rate so high that a plurality of them occur on individual sync signals.

13. A receiver as defined in claim 12 in which:
said "means responsive to the difference in signal levels between the sync signal and the back porch" developing a first output related to the signal strength of the signal received by said receiver, said noise responsive means developing a second output related to the noise appearing on the sync signal, said control means including means for dividing one of said first or second outputs by the other and utilizing the resulting quotient for controlling said bandwith control means to reduce said bandwidth in response to reduction in the signal to noise ratio.

14. A receiver as defined in claim 13 in which said bandwidth control means has only two different bandwidths one of which is broad enough to receive all of the desired intelligence signals on a single transmitting channel entering the receiver and the other bandwidth is narrower to provide improved signal to noise ratio, said control means operating to reduce said bandwidth to the narrow bandwidth when the signal to noise ratio falls below a predetermined value.

15. A receiver as defined in claim 14 in which said receiver comprises a series of stages the first of which is an input stage and the last is an output stage, said bandwidth control means being associated with one of said stages, said signal responsive means and said noise responsive means being associated with one or more stages reached by the received signals after they have passed said stage with which said bandwidth control means is associated.

16. The method of reception of frequency modulated television video intelligence signals comprising:
producing an intermediate frequency carrying said frequency modulated video intelligence,
detecting said intermediate frequency and eliminating amplitude variations therein to produce demodulated signals representing video intelligence but also having noise, and
automatically reducing the bandwidth of said intermediate frequency when the signal-to-noise ratio of said demodulated signals is reduced, comprising dividing the amplitude of one or the other of said signals and said noise by the amplitude of the other and using the quotient to reduce said bandwidth when the signal-to-noise ratio as represented by said quotient is reduced.

17. The method of claim 16 in which said reduction in bandwidth does not begin until the signal to noise ratio falls below a threshold.

18. The method of claim 17 in which said bandwidth is decreased in one or more steps when the signal to noise ratio falls below said threshold.

19. The method of claim 17 in which said bandwidth is decreased continuously when the signal to noise ratio decreases below said threshold.

20. In a television receiver:
superheterodyne means for receiving television frequency modulated video intelligence signals comprising:
(a) an I.F. amplifier,
(b) means for detecting the output of the I.F. amplifier and eliminating amplitude variations in the video intelligence signals,
(c) a bandwidth control device connected between said I.F. amplifier and the last-named means, responsive to the signal to noise ratio of said video intelligence signals, for reducing the bandwidth of the signals, passing from the I.F. amplifier through the bandwidth control device to said last-named means, in response to reduction in the signal to noise ratio of said video intelligence signals,
said bandwidth control device including:
(a) signal strength responsive means producing a first signal representing signal strength of the video intelligence in said video circuits,
(b) noise responsive means producing a second signal representing noise in said video circuits,
(c) divider means for dividing one of said first and second signals by the other, and
(d) means for controlling said bandwidth in relation to the output of said divider.

21. In a television receiver:
superheterodyne means for receiving frequency modulated video intelligence signals comprising:
(a) I.F. amplifier means having an output,
(b) bandwidth control means receiving signals from said output; said bandwidth control means having an output,
(c) means fed by said last-named output for detecting said last-named output and reducing amplitude variations therein, and
(d) video circuits fed by said last-named means,
characterized by:
said bandwidth control means including means responsive to the signal to noise ratio in said video circuits for reducing the bandwidth of the signals passing through said bandwidth control means when the signal to noise radio is reduced,
said bandwidth control means including:
(a) signal strength responsive means producing a first signal representing signal strength of the video intelligence in said video circuits,
(b) noise responsive means producing a second signal representing noise in said video circuits,
(c) divider means for dividing one of said first and second signals by the other, and
(d) means for controlling said bandwidth in relation to the output of said divider.

22. In a television receiver of claim 21:
said bandwidth control means including threshold means for establishing a threshold above which reduction in the signal to noise ratio does not reduce said bandwidth.

23. In a television receiver of claim 22:

said bandwidth control means including means for continuously reducing said bandwidth when said signal to noise ratio continues to fall below said threshold.

24. In a television receiver of claim 22:
said bandwidth control means including means for stepwise reducing said bandwidth in at least one step when said signal to noise ratio falls below said threshold.

25. In a television receiver as defined in claim 21 adapted to receive a television signal having (a) a sync signal with a sync tip, (b) a back porch, and (c) video intelligence,
said signal strength responsive means comprising means for producing said first signal in accordance with the difference in signal levels between the sync tip and the back porch.

26. In a television receiver as defined in claim 25:
said noise responsive means comprising means for determining the noise on the sync tip and developing said second signal according to the amplitude of said noise.

27. In a television receiver as defined in claim 26:
each of said signal responsive means and said noise responsive means including sample and hold means for averaging their respective signals over a series of sync tips and producing said first and second signals respectively according to said averages.

28. A television receiver as defined in claim 21 including:
means for filtering out any color burst on said back porch,
said signal strength responsive means producing said first signal in accordance with the difference in said levels after any color burst has been removed.

29. In a television receiver as defined in claim 28:
said signal strength responsive means including averaging and hold means, responsive to the difference between said levels for averaging said difference over a series of lines of the video intelligence each of which lines includes a sync tip and a back porch, to produce said first signal according to said average.

30. In a television receiver as defined in claim 29 in which:
said noise responsive means comprising:
(a) half wave rectifier means for producing a pulsating direct current according to the noise on said sync tip, and
(b) means for averaging said pulsating direct current over a series of sync tips and holding the resulting average to produce a continuous output constituting said second signal.

31. In a television receiver as defined in claim 30, said bandwidth control means including means for clamping said sync tip to ground so that the first and second signals are respectively developed with respect to the difference between the back porch and ground and the excursions of noise from ground.

32. In a television receiver as defined in claim 21:
said noise responsive means including half wave rectifier means for rectifying any noise signals appearing on said sync tip, to produce a pulsating direct current related to the noise, and
means fed by said pulsating direct current for producing said second signal representing noise in said video circuits.

33. In a television receiver as defined in claim 32, in which said last-named means comprising averaging and hold means for averaging the noise on a series of sync tips and producing said second signal according to said average.

34. In a television receiver as defined in claim 21, said television receiver being constructed and arranged to receive, for each line of a picture, (1) a sync signal, (2) a back porch, and (3) a video intelligence signal, comprising:
said signal strength responsive means comprising means responsive to the difference between the levels of the sync signal and the back porch to represent the signal strength of the video intelligence in said video circuits,
said noise responsive means being responsive to noise on the sync signals to produce said second signal representing noise in said video circuits,
timing circuits for limiting said signal strength responsive means and said noise responsive means being responsive to signals from said video circuits,
first timing circuit means for limiting (a) the time period during which signals from said video circuits may pass to said signal strength responsive means and (b) the time period during which signals from said video circuits may pass to said noise responsive means, and
additional timing circuit means for locking out said first timing circuit means during the period of video intelligence signals to thus prevent noise on the video intelligence signals from producing erroneous operation of the first timing circuit means.

35. In a receiver,
bandwidth control means for varying the bandwidth passed by said receiver,
signal responsive means responsive to signal strength of signals in said receiver,
noise responsive means responsive to noise in said receiver, and
control means responsive to both said signal responsive means and said noise responsive means for controlling said bandwidth control means to reduce the receiver bandwidth in response to reduction in the signal-to-noise ratio,
said receiver being designed to receive sync signals as well as pulses of different duration than the sync signals and comprising:
means for separating said sync signals from said pulses, and
pulse-duration-responsive means for inhibiting passage, of said pulses which are of different duration from the sync pulses, to the noise responsive means,
said noise responsive means including means for responding to the noise on the sync signals fed thereto.

* * * * *